(12) United States Patent
Nagata

(10) Patent No.: US 7,788,977 B2
(45) Date of Patent: Sep. 7, 2010

(54) PHYSICAL QUANTITY SENSOR

(75) Inventor: Yoichi Nagata, Saitama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 370 days.

(21) Appl. No.: 11/916,221

(22) PCT Filed: May 31, 2006

(86) PCT No.: PCT/JP2006/310880

§ 371 (c)(1),
(2), (4) Date: Nov. 30, 2007

(87) PCT Pub. No.: WO2006/129712

PCT Pub. Date: Dec. 7, 2006

(65) Prior Publication Data

US 2010/0011856 A1 Jan. 21, 2010

(30) Foreign Application Priority Data

Jun. 1, 2005 (JP) ............................. 2005-160956

(51) Int. Cl.
*G01C 19/56* (2006.01)
*G01P 9/04* (2006.01)
(52) U.S. Cl. ................................................ 73/504.12
(58) Field of Classification Search ............. 73/504.12, 73/504.13, 504.14, 504.15, 504.16, 514.32, 73/514.17, 514.18
See application file for complete search history.

(56) References Cited

U.S. PATENT DOCUMENTS 4,932,261 A * 6/1990 Henrion .................... 73/514.18

(Continued)

FOREIGN PATENT DOCUMENTS

JP 61-154213 A 7/1986

(Continued)

OTHER PUBLICATIONS

International Search Report of PCT/JP2006/310880, date of mailing Jun. 27, 2006.

*Primary Examiner*—Helen C. Kwok
(74) *Attorney, Agent, or Firm*—Westerman, Hattori, Daniels & Adrian, LLP

(57) ABSTRACT

A physical quantity sensor comprises a sensor circuit that converts an externally applied physical quantity to an electrical signal and outputs a detection signal; an adjustment circuit that adjusts the detection signal, which is received from the sensor circuit, to a predetermined signal; and an output circuit that forms an output signal from the signal of the adjustment circuit wherein the sensor circuit and the output circuit are driven by a common power supply voltage. The adjustment circuit comprises a pulse generation circuit that generates a pulse modulation signal based on the power supply voltage; and an amplifier circuit that amplifies the detection signal, which is received from the sensor circuit, with a gain made variable by the pulse modulation signal, wherein the detection sensitivity of the output signal is made variable according to the power supply voltage. This configuration enables the amplifier circuit, provided in the adjustment circuit, to output a sensor output that has high linearity characteristics and, as a result, implements a physical quantity sensor with highly accurate sensor detection sensitivity and allows the physical quantity sensor to have good detection-sensitivity ratiometrics characteristics, high linearity, and desired-characteristic detection sensitivity.

18 Claims, 16 Drawing Sheets

U.S. PATENT DOCUMENTS

| | | | |
|---|---|---|---|
| 5,006,487 A | * 4/1991 | Stokes | 438/52 |
| 5,095,750 A | * 3/1992 | Suzuki et al. | 73/514.19 |
| 5,365,768 A | * 11/1994 | Suzuki et al. | 73/1.01 |
| 5,417,312 A | * 5/1995 | Tsuchitani et al. | 188/181 A |
| 5,440,939 A | * 8/1995 | Barny et al. | 73/862.61 |
| 5,454,266 A | * 10/1995 | Chevroulet et al. | 73/514.18 |
| 5,612,494 A | * 3/1997 | Shibano | 73/514.32 |
| 5,621,359 A | * 4/1997 | Evert | 330/284 |
| 6,133,776 A | 10/2000 | Yunus | |
| 6,532,429 B1 | * 3/2003 | Brinks et al. | 702/104 |
| 6,588,276 B2 | * 7/2003 | Yamashita | 73/514.34 |
| 7,287,429 B2 | * 10/2007 | Umemura et al. | 73/514.32 |

FOREIGN PATENT DOCUMENTS

| | | |
|---|---|---|
| JP | 9-46150 A | 2/1997 |
| JP | 2001-227983 A | 8/2001 |
| JP | 2004-53396 A | 2/2004 |

* cited by examiner

PHYSICAL QUANTITY SENSOR

BACKGROUND OF THE INVENTION

1. Field of the Invention

The present invention relates to a physical quantity sensor, and more particularly to the configuration of the output level conversion circuit of a physical quantity sensor.

2. Description of the Related Art

Today, various types of physical quantity sensors are used. Especially, many proposals are made for the correction of the sensor output of an angular rate sensor typified by a vibratory gyroscope (gyro).

The prior-art technology disclosed in Patent Document 1 proposes a method for changing the detection sensitivity of a physical quantity sensor in proportion to a change in the power supply voltage at which the physical quantity sensor operates. This method is known as ratiometric. FIG. 14 and FIG. 15 are diagrams showing a general ratiometric configuration. In this ratiometric configuration, a sensor 110 and an A/D converter 120 receive the supply of the common power voltage Vref. FIGS. 15A-15C and FIGS. 15D-15F show cases in which only one of the sensor 110 and the A/D converter 120 corresponds to the power supply voltage Vref.

FIGS. 15A-15C show an example in which only the sensor 110 corresponds to the power supply voltage Vref. In this example, the output of the sensor 110 (FIG. 15A) is decreased by a change (a decrease in this example) in the power supply voltage Vref. When the output of the sensor 110 is converted by the A/D converter 120 to output digital signals, there is a difference in the A/D-converted digital values because the A/D converter 120 does not correspond to the change in the power supply voltage Vref (FIGS. 15B and 15C).

FIGS. 15D-15F show an example in which only the A/D converter 120 corresponds to the power supply voltage Vref. In this example, the output of the sensor 110 (FIG. 15D) does not depend on a change in the power supply voltage Vref. When the output of the sensor 110 is converted by the A/D converter 120 to output digital signals, there is a difference in the A/D-converted digital values because the A/D converter 120 corresponds to the change in the power supply voltage Vref (FIGS. 15E and 15F).

On the other hand, FIGS. 15G-15I show an example in which both the sensor 110 and the A/D converter 120 correspond to the power supply voltage Vref. In this example, the output of the sensor 110 (FIG. 15G) is decreased by a change (a decrease this example) in the power supply voltage Vref. When the output of the sensor 110 is converted by the A/D converter 120 to output digital signals, there is no difference in the A/D-converted digital values because the A/D converter 120 also corresponds to the change in the power supply voltage Vref (FIGS. 15H and 15I).

The conventional physical quantity sensor shown in FIG. 16 has a configuration in which the output signal of a sensor element 1 detected by a detection circuit 2 is amplified by an amplifier circuit 6.

The amplifier circuit 6 is an inverting amplifier circuit built by an operational amplifier 4 with a MOS device 7 as the input resistor and with a resistor element 8 as the feedback resistor. Biasing the gate voltage of the MOS device 7 with the voltage that varies according to the power supply voltage of the physical quantity sensor allows the detection sensitivity of the physical quantity sensor to be adjusted, especially, the detection sensitivity of the physical quantity sensor to be changed in proportion to a change in the power supply voltage.

Patent Document 1: Japanese Patent Laid-Open Publication No. 2004-53396 (pp. 4-6, FIG. 1)

However, it is known that the resistance component of the MOS device 7, which generally has non-linearity characteristics, operates as a linear resistor element only when the input voltage is extremely low. Therefore, when the amplitude of an input signal to this amplifier circuit 6 is high, the gain differs between a range where the output signal from the sensor element 1 is high and a range where the output signal is low. This difference in gain does not ensure the linearity of the detection sensitivity (scale factor) of the physical quantity sensor with the result that the ratiometric characteristics remain unimproved.

In addition, depending upon the characteristics of the sensor element or the output characteristics required for the physical quantity sensor, not only the linearity between the power supply voltage and the detection sensitivity but also a desired relation between them is required. However, the amplifier circuit described above, where the MOS device 7 is used, does not give desired sensitivity characteristics because the gain depends on the characteristics of the MOS device.

SUMMARY OF THE INVENTION

It is an object of the present invention to solve the problems described above. More specifically, an object of the present invention is to ensure better ratiometric characteristics in the detection sensitivity of a physical quantity sensor.

It is another object of the present invention to provide a physical quantity sensor that has a higher linearity and more accurate detection sensitivity than those of the prior-art physical quantity sensor.

It is still another object of the present invention to provide a physical quantity sensor with the ability to give desired characteristics detection sensitivity.

A physical quantity sensor according to the present invention generates a pulse modulation signal based on the power supply voltage, makes variable the gain of an amplifier circuit by the pulse modulation signal and, with the use of the pulse modulation signal, ensures high linearity and gives highly accurate detection sensitivity. The use of the pulse modulation signal also gives desired characteristic detection sensitivity.

The pulse modulation is either a pulse width modulation in which the pulse width is modulated or a pulse frequency modulation in which the pulse frequency is modulated. The pulse width modulation can be represented by a duty cycle that is a ratio between the time width during which the pulse is output and the time width during which the pulse is not output.

The relation between the pulse width or the pulse frequency that determines the modulation amount of pulse modulation and the power supply voltage can be determined arbitrarily. Therefore, not only the linear relation but some other relation between the power supply voltage and the output signal, produced by the amplifier circuit, can be determined arbitrarily as a predetermined function relation based on the modulation relation of this pulse modulation.

This amplifier circuit has a configuration in which the gain can be changed by the switch open/close control. The pulse modulation signal can be used for this switch open/close control to change the gain via pulse modulation.

Therefore, the relation between the power supply voltage and the output signal obtained by the amplifier circuit can be determined arbitrarily based on the modulation relation of this pulse modulation. Not only the linear relation but also other predetermined relations may be set for the relation between the power supply voltage and the sensitivity characteristics.

The physical quantity sensor of the present invention comprises a sensor circuit that converts an externally applied physical quantity to an electrical signal and outputs a detection signal; and an adjustment circuit that adjusts the detection signal, which is received from the sensor circuit, to a predetermined signal.

In addition, the adjustment circuit of the present invention comprises a pulse generation circuit that generates a pulse modulation signal based on a power supply voltage that drives the adjustment circuit; and an amplifier circuit that amplifies the detection signal, which is received from the sensor circuit, with a gain made variable by the pulse modulation signal wherein the detection sensitivity of the output signal output from the amplifier circuit is made variable according to the power supply voltage. The pulse width or the pulse frequency for the power supply voltage may be determined by not only a linear function but also a predetermined function. When the predetermined function is a linear function, the pulse generation circuit generates a pulse modulation signal with a pulse width or a pulse frequency proportional to the power supply voltage.

The pulse generation circuit performs pulse modulation based on the power supply voltage to modulate the signal to the pulse width or pulse frequency, defined by a predetermined function, for generating a pulse modulation signal. The pulse modulation, which can be performed regardless of the amplitude of the detection signal to be amplified, gives not only a high-linearity, high-accuracy detection sensitivity but also desired-characteristic detection sensitivity.

One configuration of the amplifier circuit is an inverting amplifier whose gain is determined by a resistance value ratio between an input resistor circuit and a feedback resistor circuit. In this inverting amplifier, at least one of the input resistor circuit and the feedback resistor circuit is a variable resistor circuit whose resistance value is made variable by the pulse modulation signal, and the amplifier circuit makes the gain variable by making variable the resistance value of the variable resistor circuit by means of the pulse modulation signal.

The variable resistor circuit can be configured by a switched capacitor circuit. The switched capacitor circuit performs the switching of a switch, provided for a capacitor, by means of the pulse modulation signal to make variable an equivalent resistor.

The variable resistor circuit can be configured by resistors and a switch. An equivalent resistor is made variable by intermittently turning on and off the switch by the pulse modulation signal.

In addition, the variable resistor circuit is configured by connecting two switches with a capacitor between them, and an equivalent resistor is made variable by charging/discharging the capacitor by a switching of the two switches with the switching of the switches based on the pulse width or the duty cycle of the pulse modulation signal.

An amplifier circuit having another configuration is a gain adjustment circuit configured by connecting two voltage-current conversion circuits with a switch between them. This gain adjustment circuit opens and closes the switch by the pulse modulation signal. The transfer function of the gain adjustment circuit is changed by changing the switch open/close state based on the pulse modulation signal. Because the gain of the gain adjustment circuit depends on the transfer function of the gain adjustment circuit, the gain is made variable by making variable the transfer function by the pulse modulation signal.

The pulse generation circuit that generates a pulse modulation signal compares a triangular wave, which has constant amplitude, with a predetermined threshold and, during a period when the triangular wave is higher or lower than the threshold, generates a pulse, where the threshold is the power supply voltage.

To achieve the above object, the physical quantity sensor of the present invention has the following structure.

The physical quantity sensor comprises a sensor element that converts an externally applied physical quantity to an electrical signal; a detection circuit that amplifies and detects an output signal of the sensor element; and an adjustment circuit that adjusts an output signal, received from the detection circuit, to a predetermined signal by applying a power supply wherein the adjustment circuit comprises an amplifier circuit that comprises a switched capacitor circuit that moves electrical charges by switching a connection state of a capacitor; and a clock generation circuit that generates a clock signal. In this way, the physical quantity sensor controls the clock generation circuit based on the power supply voltage and, based on the clock signal generated by the clock generation circuit, makes variable a detection sensitivity of an output signal, which is output from the amplifier circuit, according to the power supply voltage.

This configuration enables the amplifier circuit, provided in the adjustment circuit, to output a sensor output that has high linearity characteristics and, as a result, implements a physical quantity sensor with specifically highly accurate sensor detection sensitivity.

The adjustment circuit comprises a clock generation circuit that generates a clock signal, and the switched capacitor circuit switches the connection state of the capacitor by the clock signal. In this configuration, a special clock generation circuit, which generates the clock signal for switching the switched capacitor circuit, is provided to drive the switched capacitor circuit accurately. The clock signal is a periodic signal having a predetermined pulse width, a predetermined duty cycle, or a predetermined pulse frequency. The physical quantity sensor of the present invention makes variable the pulse width, the duty cycle, or the frequency according to the power supply voltage.

The clock generation circuit is controlled according to the power supply voltage. The amplifier circuit is controlled by the clock signal generated by the clock generation circuit to allow the output signal, output from the amplifier circuit, to be proportional to the power supply voltage. This configuration implements the so-called ratiometric characteristics where the detection sensitivity of the physical quantity sensor is proportional to the power supply voltage.

The clock generation circuit comprises an oscillation circuit that outputs an oscillation signal and a control circuit that divides the output signal of the oscillation circuit by a predetermined division ratio and outputs the divided signal. This configuration accurately adjusts the average frequency of the clock signal, thus making it easy to adjust the detection sensitivity error of the physical quantity sensor caused by the fabrication error of the sensor element.

The clock generation circuit comprises an oscillation circuit. This oscillation circuit is configured by a voltage controlled oscillator that varies the frequency of an output signal thereof according to the voltage input of the power supply. This configuration easily and accurately implements a physical quantity sensor that provides the so-called ratiometric output, as well as the temperature characteristics, where the detection sensitivity of the physical quantity sensor is proportional to the power supply voltage.

The clock generation circuit comprises an oscillation circuit which has a capacitor. The capacitor of the oscillation circuit has the same structure as the capacitor provided in the amplifier circuit. This configuration makes the capacitance ratio constant and so increases the accuracy of the gain of the amplifier circuit.

The clock generation circuit comprises an oscillation circuit, which has a resistor element. The resistor element of the oscillation circuit may have the same structure as the resistor element provided in the amplifier circuit. This configuration makes the resistance ratio constant and so increases the accuracy of the gain of the amplifier circuit.

A physical quantity sensor of the present invention comprises a sensor element that converts an externally applied physical quantity to an electrical signal; a driving circuit that drives the sensor element; a detection circuit that amplifies and detects an output signal of the sensor element; and an adjustment circuit that adjusts an output signal, received from the detection circuit, to a predetermined signal by applying a power supply. The driving circuit comprises a constant voltage circuit that outputs a constant voltage used as a base of driving conditions of the sensor element. The adjustment circuit comprises an amplifier circuit that comprises a switched capacitor circuit that moves electrical charges by switching a connection state of a capacitor; and a clock generation circuit that generates a clock signal. In this way, the physical quantity sensor controls the clock generation circuit based on the power supply voltage and, based on the clock signal generated by the clock generation circuit, makes variable a detection sensitivity of an output signal, which is output from the amplifier circuit, according to the power supply voltage.

This configuration allows the driving circuit to stably drive the sensor element without being affected by a change in the power supply voltage and, in addition, allows the amplifier circuit to provide high-linearity sensor output, and implements the ratiometric characteristics proportional to the power supply voltage. As a result, a physical quantity sensor with highly accurate detection sensitivity can be provided. The physical quantity sensor of the present invention is a physical quantity sensor that comprises a sensor element that converts an externally applied physical quantity to an electrical signal; detection means that amplifies and detects an output signal of the sensor element; and adjustment means that adjusts an output signal, received from the detection circuit, to a predetermined signal wherein the adjustment means comprises clock generation means having an oscillation circuit and amplification means that performs amplification operation based on the clock signal generated by the clock generation means. In this way, the level of an output from the detection means is converted for output.

The present invention allows the amplifier circuit, included in the adjustment circuit, to provide high-linearity sensor output and, therefore, provides a physical quantity sensor having highly accurate sensor detection sensitivity.

DETAILED DESCRIPTION OF THE PREFERRED EMBODIMENTS

Description of the General Configuration of Physical Quantity Sensor

FIG. 1-FIG. 3

Figure 1:
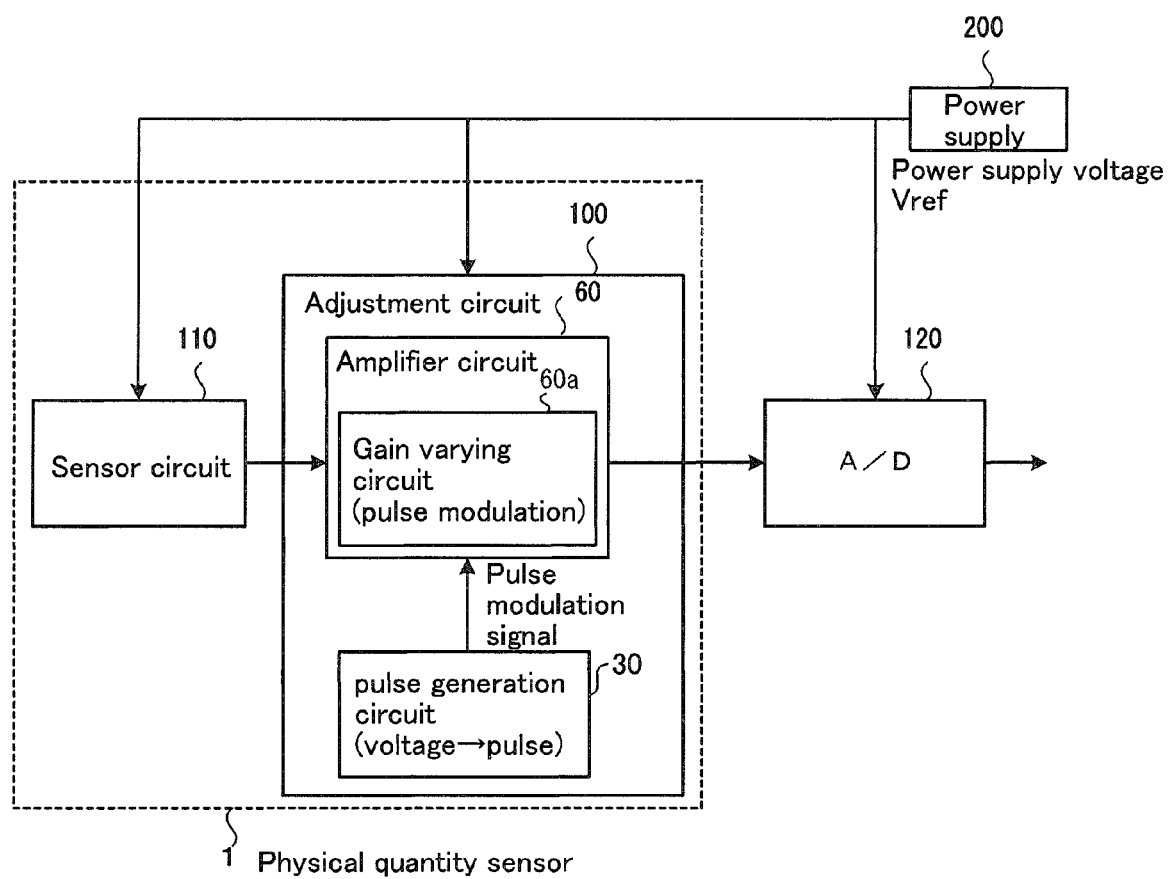
FIG. 1 is a block diagram showing the general configuration of a physical quantity sensor of the present invention.

A physical quantity sensor of the present invention and its peripheral configuration will be described with reference to FIG. 1-FIG. 3. FIG. 1 is a block diagram showing the general configuration of the physical quantity sensor of the present invention.

Referring to FIG. 1, a physical quantity sensor 1 comprises a sensor circuit 110 that outputs a signal according to the physical quantity and an adjustment circuit 100 that performs signal processing, such as, amplification, for the output signal of the sensor circuit 110. A power supply 200 and an A/D converter 120 are connected to the physical quantity sensor 1. The A/D converter 120 receives an analog signal processed by the adjustment circuit 100 and converts it to a digital signal. The sensor circuit 110, adjustment circuit 100, and A/D converter 120 receive the supply of the power supply voltage Vref from the power supply 200, and the A/D converter 120 performs A/D conversion based on the power supply voltage Vref.

The adjustment circuit 100, which comprises a pulse generation circuit 30 and an amplifier circuit 60, is driven by the power supply 200. The amplifier circuit 60 comprises a gain varying circuit 60a. The pulse generation circuit 30 generates a pulse modulation signal whose pulse width and pulse frequency are modulated according to the power supply voltage. Note that the pulse width can be determined by the duty cycle that is the ratio between the on-time and off-time of the pulse.

The gain varying circuit 60a varies the gain of the amplifier circuit 60 based on the pulse modulation signal generated by the pulse generation circuit 30. Although the embodiment shown in FIG. 1 shows an example in which the sensor circuit 110 and the adjustment circuit 100 operate on the same power supply, the present invention is not limited to this configuration but those circuits may be driven by separate power supplies.

Figure 2A:
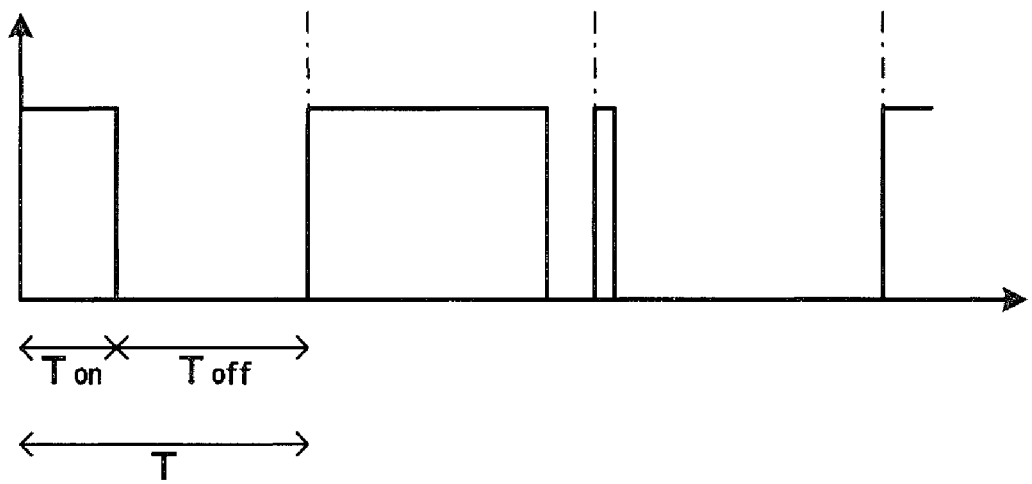
FIG. 2 is a diagram showing an example of the pulse modulation signal generated by a pulse generation circuit.

FIG. 2 shows an example of the pulse modulation signal generated by the pulse generation circuit 30. FIG. 2A shows an example of PWM (Pulse Width Modulation) in which the pulse width is modulated according to the voltage value of the power supply voltage Vref with the duty cycle (for example, Ton/T) set according to the voltage value of the power supply voltage Vref. Note that T=Ton+Toff.

Figure 2B:
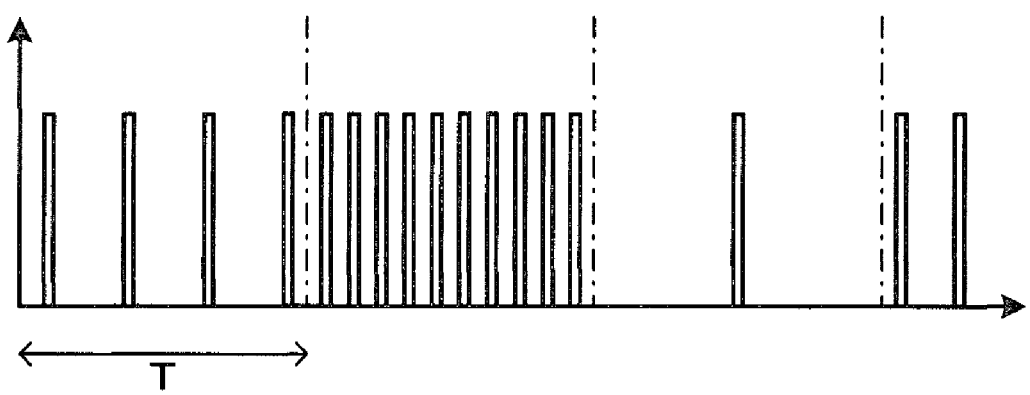

FIG. 2B shows an example of PFM (Pulse Frequency Modulation) in which the pulse frequency is modulated according to the voltage value of the power supply voltage Vref. For example, the number of pulses generated during a predetermined frequency interval T is set according to the voltage value of the power supply voltage Vref.

In the configuration described above, the pulse modulation signal is generated whose pulse width or pulse frequency is modulated based on the power supply voltage Vref, the gain is varied based on the generated pulse modulation signal and, thus, the sensor output is amplified based on the power supply voltage Vref. In this way, the adjustment circuit 100 of the present invention can vary the gain according to a change in the power supply voltage Vref, thus allowing the sensor output of the sensor circuit 110 to have the ratiometric characteristics proportional to the power supply voltage.

The relation between the power supply voltage Vref of the power supply 200 supplied to the adjustment circuit 100 and the output of the amplifier circuit 60 may have the linearity characteristics and any other arbitrary characteristics. The relation between the power supply voltage Vref and the output of the amplifier circuit can be determined by the pulse modulation characteristics of the pulse generation circuit 30. The correspondence relation between the power supply voltage Vref and the pulse width or the pulse frequency, represented as a conversion function or a conversion table, can be stored in advance in the recording medium such as a ROM. The pulse generation circuit 30 assigns the received power supply voltage Vref to the conversion function, or uses the conversion table, to produce the pulse modulation signal corresponding to the value of the power supply voltage Vref.

Figure 3A:
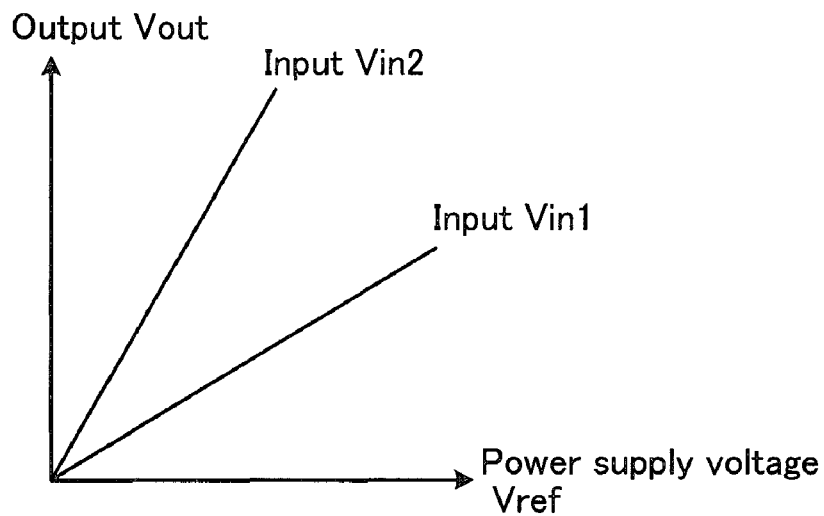
FIG. 3 is a diagram showing the relation between the power supply voltage Vref of the power supply and the output of an amplifier circuit.
Figure 3B:
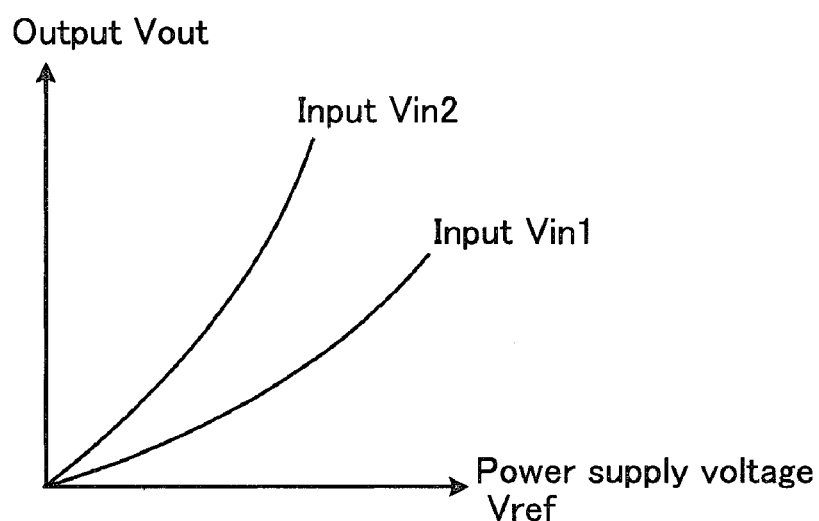
Figure 3C:
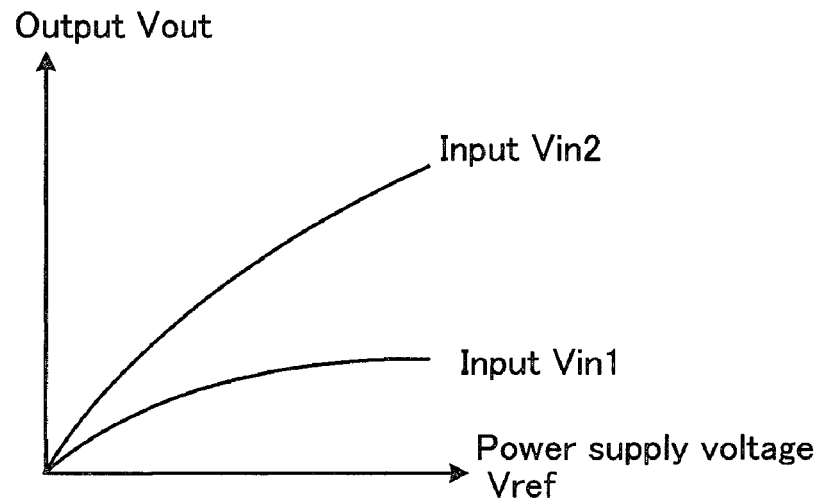

FIG. 3A shows an example in which the relation between the power supply voltage Vref and the output of the amplifier circuit is linear. In this case, when the power supply voltage Vref is changed, the amplifier circuit receives an input voltage Vin and produces its output linearly. FIGS. 3B and 3C show examples in which the relation between the power supply voltage Vref and the output of the amplifier circuit is determined by a predetermined function relation. In this case, when the power supply voltage Vref is changed, the amplifier circuit receives an input voltage Vin and produces its output according to the relation determined by the predetermined function.

Because the relation between the power supply voltage Vref and the output of the amplifier circuit depends also on the characteristics of the amplifier circuit 60, a predetermined function relation is set for the pulse generation circuit 30 considering the characteristics of the amplifier circuit 60 so that the desired characteristics can be obtained. For example, to make linear the relation between the power supply voltage Vref and the output of the amplifier circuit when the amplifier circuit 60 has non-linearity characteristics, the pulse generation circuit 30 performs pulse modulation so that the non-linearity characteristics are offset.

Description of One Embodiment of Physical Quantity Sensor

FIG. 4-FIG. 6

Figure 4:
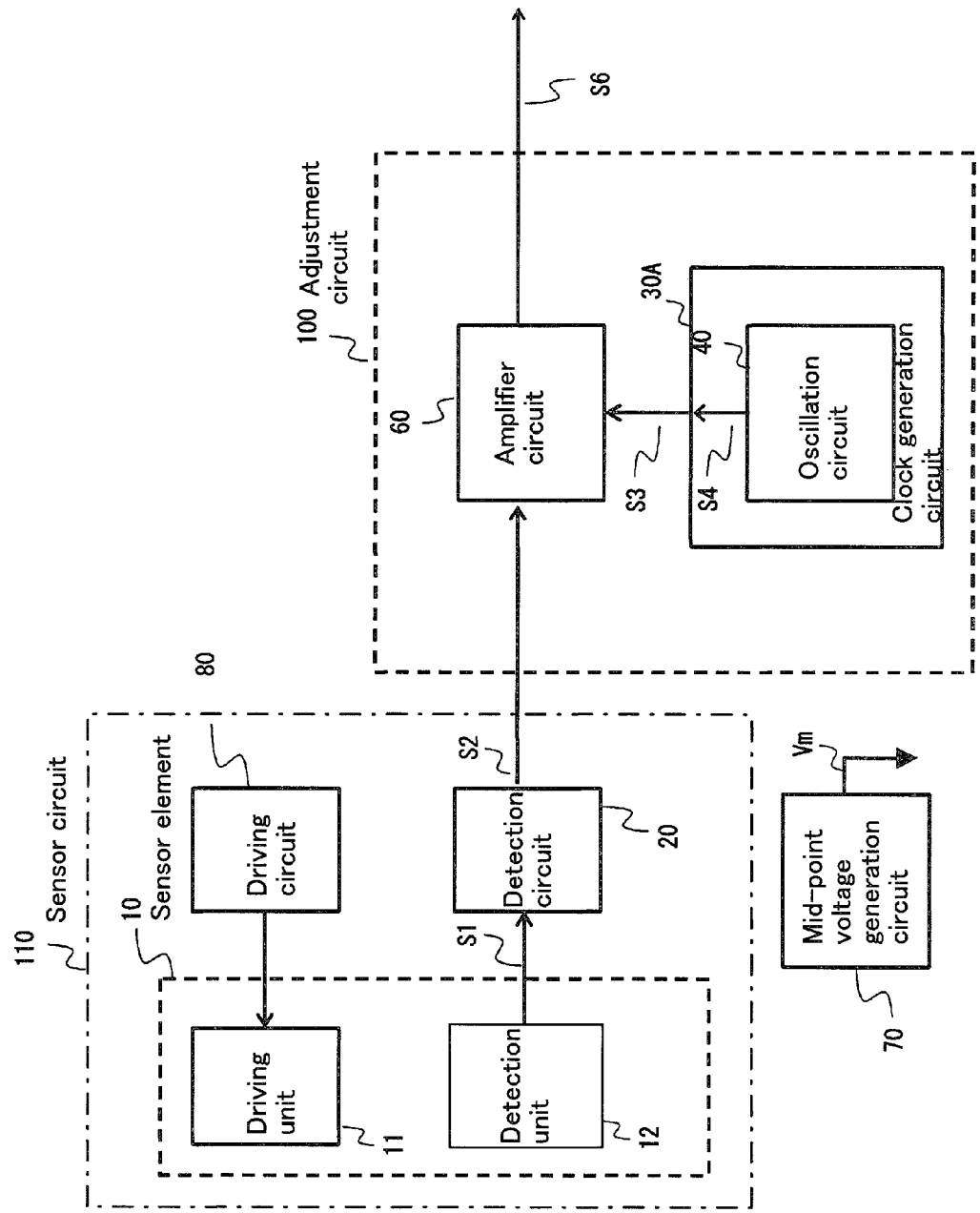
FIG. 4 is a block diagram showing the general configuration of one embodiment of the physical quantity sensor of the present invention.
Figure 5:
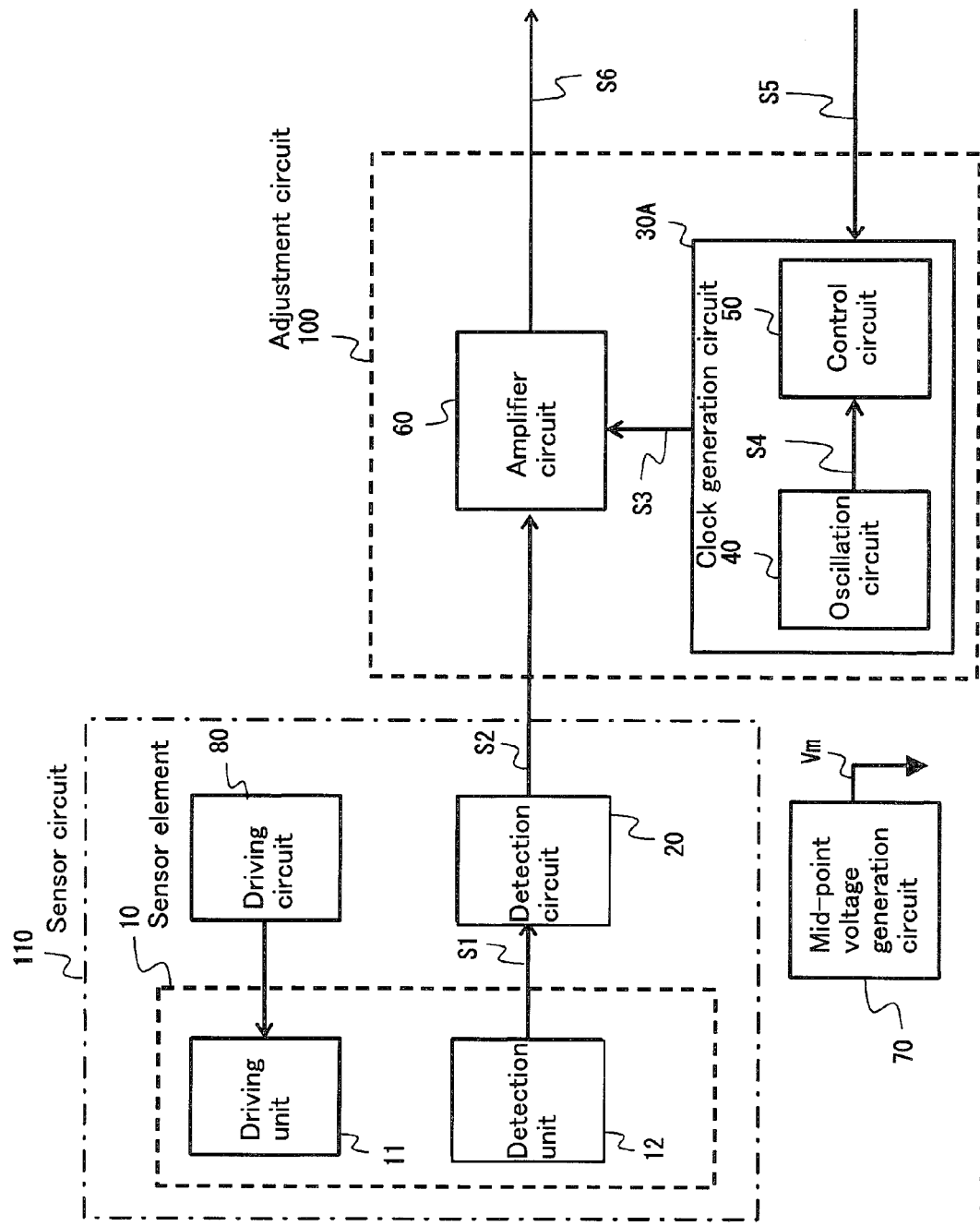
FIG. 5 is a block diagram showing the general configuration of another embodiment of the physical quantity sensor of the present invention.
Figure 6:
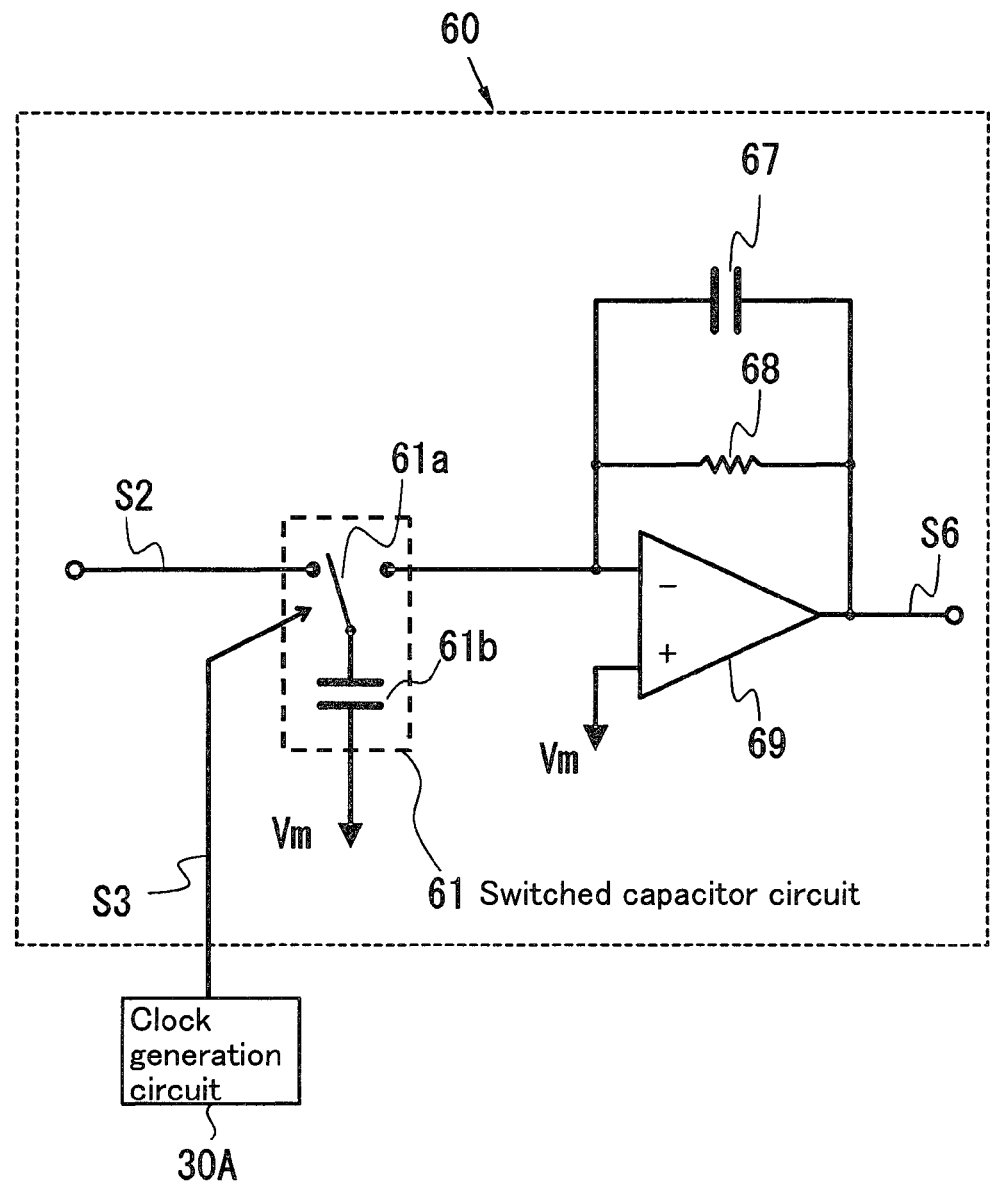
FIG. 6 is a circuit diagram showing the configuration of an amplifier circuit of the physical quantity sensor of the present invention.

Next, the following describes one embodiment of a physical quantity sensor of the present invention with reference to FIG. 4 to FIG. 6. FIG. 4 is a block diagram showing the generation configuration of the physical quantity sensor in one embodiment of the present invention.

Description of the General Configuration

FIG. 4

First, the following describes the general configuration in the embodiment of the physical quantity sensor of the present invention with reference to FIG. 4. The figure shows the sensor circuit 110 and the adjustment circuit 100 in the configuration diagram shown in FIG. 1 given above.

In FIG. 4, the numeral 10 indicates a sensor element that comprises a driving unit 11 and a detection unit 12. The numeral 20 indicates a detection circuit that amplifies and detects the sensor element output S1 from the detection unit 12. The driving unit 11 is driven by a driving circuit 80. Although the sensor circuit 110 may be configured by the sensor element 10, detection circuit 20, and driving circuit 80, the detection circuit 20 and the driving circuit 80 may be configured separately from the sensor circuit 110. For example, the detection circuit 20 may be included in the adjustment circuit 100, and the driving circuit 80, along with a mid-point voltage generation circuit 70, may be included in a circuit configuration related to the voltage.

The numeral 100 indicates an adjustment circuit that comprises the amplifier circuit 60 and a clock generation circuit 30A. The clock generation circuit 30A comprises an oscillation circuit 40 and constitutes the pulse generation circuit 30 shown in FIG. 1. The numeral 60 indicates amplification means, the numeral 100 indicates adjustment means, and the numeral 80 indicates a driving circuit for driving the driving unit 11 of the sensor element 10. The numeral 70 indicates the power voltage source, on which the detection circuit 20 and the amplifier circuit 60 operate, that outputs, for example, the voltage value of the half of the power supply voltage.

In addition, in FIG. 4, the numeral S1 indicates the output of the detection unit 12 of the sensor element, the numeral S2 indicates the detection output of the detection circuit 20, the numeral S3 indicates the clock signal of the clock generation circuit 30A, the numeral S4 indicates the oscillation output of the oscillation circuit 40, and the numeral S6 indicates the sensor output from the physical quantity sensor. The circuit parts of this physical quantity sensor, that is, the detection circuit 20, adjustment circuit 100, and driving circuit 80, operate on the voltage Vdd (for example, 5.0V) that is externally applied. Vdd is the power supply voltage of the physical quantity sensor.

The sensor element 10 may be used for, for example, a gyro transducer that detects the rotational angular rate. The sensor element used for a gyro transducer is configured by placing a metal electrode on the surface of a tuning-fork-shaped piezoelectric material. The sensor element 10 is oscillation-driven by the driving circuit 80 and, when this sensor element 10 receives a rotational angular rate during vibration, a weak ac signal appears as the sensor element output S1.

The driving circuit 80 is a circuit that has the function that makes constant the driving condition of the sensor element 10, for example, the function that controls the oscillation so that the current value received from a highly-accurate constant-current source (not shown), which is not affected by a change in the power supply voltage, is equal to the effective value of the excitation current of the sensor element 10. Another configuration is also possible in which a constant-voltage circuit, which outputs a constant voltage without being affected by a change in the power supply voltage, is used for the driving circuit 80 to stabilize the excitation current of the sensor element 10 based on this constant voltage.

The detection circuit 20 is a circuit that detects and amplifies the sensor element output S1, received from the sensor element 10, and outputs a dc-converted signal. The detection output S2 is output from the detection circuit 20. The configuration of the sensor element 10 and the detection circuit 20 is generally known and, so, the description is omitted here.

The adjustment circuit 100 is a signal level conversion circuit that adjusts the detection output S2, detected and amplified by the detection circuit 20, to a predetermined level, that is, adjusts the detection sensitivity of the physical quantity sensor, and outputs the adjusted level to an external unit as a physical quantity sensor output S6. The adjustment circuit 100 is configured by the clock generation circuit 30A and the amplifier circuit 60. The clock generation circuit 30A, a circuit corresponding to the pulse generation circuit 30 in FIG. 1, generates and outputs the clock signal corresponding to the voltage applied by the power supply circuit. The amplifier circuit 60 is an amplifier circuit that has the so-called switched capacitor circuit 61 (FIG. 6), which moves electric charges by switching the connection state of the capacitor, in the input stage. This switched capacitor circuit 61, a circuit corresponding to the gain varying circuit 60a in FIG. 1, makes the gain variable based on the clock signal corresponding to the pulse modulation signal.

The clock generation circuit 30A has the oscillation circuit 40. This oscillation circuit 40 can be configured by a voltage controlled oscillator (VCO) that varies the output frequency in proportion to the applied voltage (for example, power supply voltage Vref). This configuration causes the clock generation circuit 30A to output a clock signal S3 with the frequency proportional to the applied voltage.

The clock generation circuit 30A, which has the oscillation circuit 40 and a control circuit 50, divides the oscillation output oscillated by the oscillation circuit 40 to vary the number of output pulses per unit time. FIG. 5 shows an example of the configuration. The configuration shown in FIG. 5 is similar to the configuration shown in FIG. 4 except that the clock generation circuit 30A has the oscillation circuit 40 as well as the control circuit 50 to which the control signal (S5) is input from an external source. The description of other configuration is omitted.

The control circuit 50 is a logic circuit that divides an oscillation output S4 and outputs the divided signals as the clock signals S3. The division ratio of the control circuit 50 may be selectively set by a digital input S5 from the rational numbers prepared in advance. The control circuit 50 may be easily implemented by a rate multiplier circuit that can switch the number of output pulses per unit time and, so, the detailed description is omitted. The configuration of the oscillation circuit 40 and the amplifier circuit 60 will be described later.

The mid-point voltage generation circuit 70 is a voltage source that outputs the half of the voltage value of the power supply voltage applied to the physical quantity sensor. The mid-point voltage generation circuit 70 supplies the mid-point voltage Vm for the detection circuit 20 and the amplifier circuit 60 to operate. For example, when the power supply voltage Vdd is 5.0V, the mid-point voltage generation circuit 70 generates and outputs 2.5V as the mid-point voltage Vm.

Description of the Configuration of Amplifier Circuit 60

FIG. 6

Next, the following describes an example of the configuration of the amplifier circuit 60 with reference to FIG. 6. The amplifier circuit 60 shown in FIG. 6 is an example in which the circuit configuration includes a switched capacitor circuit for varying the gain. The amplifier circuit 60 has the configuration of an inverting amplifier circuit that has an operation amplifier 69. A feedback resistor 68 and a filter capacitor 67 are connected in parallel between the output end and the input end (inverting input terminal) of the operation amplifier 69, and the switched capacitor circuit 61 is connected to the input end (inverting input end) of the operation amplifier 69 as the input resistor. The switched capacitor circuit 61 comprises a two-contact switch 61a having two contacts and a capacitor 61b.

The switch 61a is configured by a transmission gate comprised of MOS element device. In particular, the switch 61a is configured so that its contact state can be switched according to the clock signal S3. That is, the connection state of the capacitor 61b is switched based on the clock signal S3. In addition, the capacitor 61b and the feedback resistor 68 can be fabricated similarly by the semiconductor process with those components on the same semiconductor chip as that of the switch 61a.

One end of the capacitor 61b is connected to the mid-point voltage Vm, and the other end is connected to the fixed contact of the switch 61a. One of the contacts of the switch 61a is the input terminal of the amplifier circuit 60, and the detection output S2 is connected to this input terminal. The other contact of the switch 61a is connected to the inverting input terminal of the operation amplifier 69. Both the feedback resistor 68 and the filter capacitor 67 are connected between the inverting input terminal and the output terminal of the operation amplifier 69. The non-inverting input terminal of the operation amplifier 69 is connected to the mid-point voltage Vm.

The switched capacitor circuit 61 is configured by the switch 61a and the capacitor 61b. When the contact of the switch 61a is connected to the detection output S2 side, the capacitor 61b stores the voltage of the detection output S2. Next, when the switch 61a is connected to the operation amplifier 69 side, the electric charge stored in the capacitor 61b is discharged to the feedback resistor 68 and the filter capacitor 67 via the operation amplifier 69.

The switch 61a is switched between the detection output S2 side and the operation amplifier 69 side according to the clock signal S3 generated by the clock generation circuit 30A for switching the connection state of the capacitor 61b. This configuration, where the clock generation circuit 30A is provided specifically to generate the clock signal S3 for switching the switched capacitor circuit 61, accurately drives the switched capacitor circuit 61.

When the switch 61a performs the above-described switching operation at a high speed, the switched capacitor circuit 61 performs the operation equivalent to that of a resistor element whose resistance value is represented by the following expression Re.

$$Re = 1/(f \cdot Cs)$$

where, f is the average switching frequency of the switch 61a and Cs is the capacitance of the capacitor 61b.

Because the switched capacitor circuit 61 is equivalent to a resistor element, the amplifier circuit 60 operates as a primary low-pass filter (incomplete integration circuit) that uses an inverting amplifier circuit. The gain of the amplifier circuit 60 is determined by the ratio between the feedback resistor and the input resistor. Therefore, the gain of the amplifier circuit can be made variable in the configuration described above by configuring the input resistor by a switched capacitor circuit and by changing the equivalent resistance of this switched capacitor circuit based on the frequency of the clock signal S3. So, changing the frequency of the clock signal according to the power supply voltage allows the gain of the amplifier circuit to be changed variably according to the power supply voltage.

The amplifier circuit 60, in which the switched capacitor circuit 61 is used, gives high linearity by implementing the capacitor 61b using a capacitor whose capacitance does not depend on the voltage. To fabricate a capacitor having such characteristics on a semiconductor chip, the general two-layer polysilicon process is used to configure a capacitor 61b with polysilicon electrodes.

Although the input resistor of the operation amplifier 69 is configured by the equivalent resistor made of the switched capacitor circuit 61 in the above example, the feedback resistor 68 of the operation amplifier 69 may also be configured by the equivalent resistor made of the switched capacitor circuit.

The gain of the amplifier circuit 60 is determined by the ratio between the feedback resistor and the input resistor as described above. Therefore, the gain of the amplifier circuit may be made variable by configuring the switched capacitor circuit by the feedback resistor and changing the equivalent resistance of this switched capacitor circuit according to the frequency of the clock signal S3. This configuration is not shown in the figure. Thus, changing the frequency of the clock signal according to the power supply voltage can make variable the gain of the amplifier circuit according to the power supply voltage.

In addition to configuring one of the feedback resistor and the input resistor by the switched capacitor circuit, both resistors may also be configured by the switched capacitor circuit.

Description of the Configuration of Oscillation Circuit 40

FIG. 7

Figure 7:
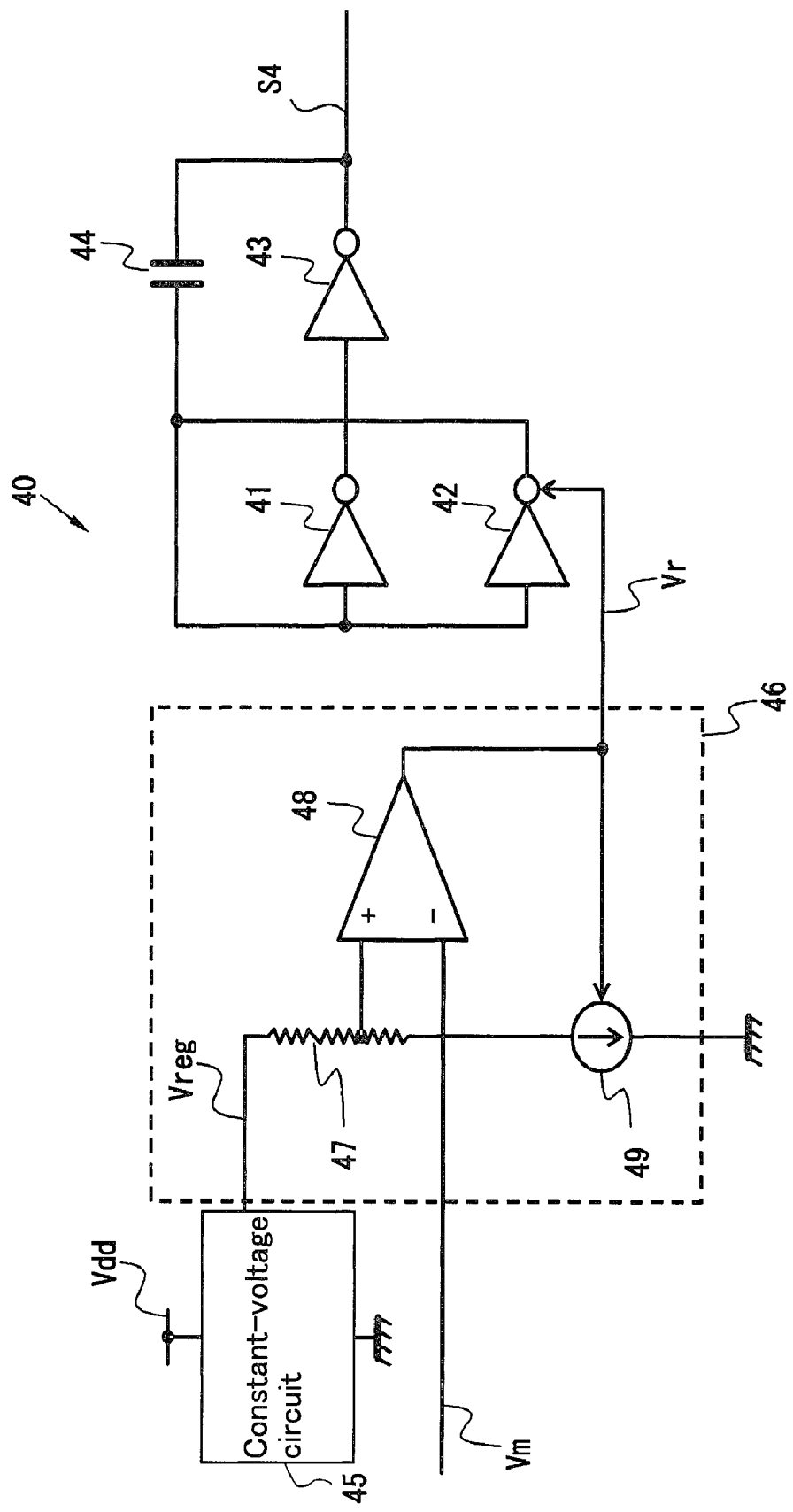
FIG. 7 is a circuit diagram showing the configuration of a clock generation circuit of the physical quantity sensor of the present invention.

Next, the following briefly describes the configuration of the oscillation circuit 40, which is an example of the voltage controlled oscillator, with reference to FIG. 7. The oscillation circuit 40 comprises inverters 41-43, an oscillator capacitor 44, a constant-voltage circuit 45 that functions as a constant-voltage source, and a bias voltage generation circuit 46. The bias voltage generation circuit 46 comprises a base resistor 47, a comparator 48, and a current control element 49.

The constant-voltage circuit 45 is a voltage regulator that outputs a predetermined constant voltage (for example, 2.0V) when the power supply voltage Vdd of the physical quantity sensor is applied. The inverters 41-43 are logic inversion circuits that operate on the constant voltage Vreg that is output from the constant-voltage circuit 45. A circular configuration is formed in which the inverter 41 is connected in series to the inverter 43 and the output of the inverter 43 is connected to the input terminal of the inverter 41 via the oscillator capacitor 44. The input/output terminals of the inverter 42 are both connected to the input terminal of the inverter 41.

In particular, the inverter 42 is an inverter that can control the output characteristics. That is, the inverter 42 is configured in such a way that the value of the current input to, or output from, the output terminal (sink/source of the output terminal) can be controlled. The current of the inverter 42 is controlled by the bias voltage Vr generated by the bias voltage generation circuit 46. The output of the inverter 43 is the oscillation output S4 of the oscillation circuit 40. Although the detail will be described later, the oscillation frequency of the oscillation output S4 is changed according to the power supply voltage Vdd of the physical quantity sensor in this configuration.

The bias voltage generation circuit 46 is configured by connecting the base resistor 47 across the power supply voltage (between Vdd and ground) of the physical quantity sensor via the current control element 49 and connecting the comparator 48 that controls the current control element 49 so that the voltage of an appropriate voltage-dividing point on the base resistor 47 is equal to the mid-point voltage Vm. The output of the comparator 48 is connected to the current control signal input of the inverter 42 as the bias voltage Vr and, in addition, the bias voltage Vr is connected to the current control signal input of the current control element 49.

Because the mid-point voltage Vm is changed when the power supply voltage Vdd of the physical quantity sensor is changed, the current of the current control element 49 is controlled by the comparator 48 and the current proportional to the power supply voltage Vdd flows through the current control element 49. This control information is transmitted to the inverter 42 by the bias voltage Vr, and the value of current input to, and output from, the output terminal of the inverter 42 is also set to a value proportional to the power supply voltage Vdd of the physical quantity sensor.

The current value that is set for the inverter 42 corresponds to the charge/discharge current of the oscillator capacitor 44 and, so, the oscillation time-constant, that is, the oscillation frequency, of the oscillation circuit 40 is determined by the capacitance value of the oscillator capacitor 44 and the current value that is set for the inverter 42. Therefore, this configuration allows the oscillation circuit 40 to work as the voltage controlled oscillator because the frequency of the oscillation output S4 is proportional to the value of the power supply voltage applied to the physical quantity sensor.

The time-constant for generating the oscillation output S4 is expressed by the capacitance value of the oscillator capacitor 44 and the resistance value of the base resistor 47 that determines the charge/discharge current value of the oscillator capacitor 44. The frequency fo of the oscillation output S4 is as follows.

$$fo \propto f$$

$$\propto 1/(R \cdot C)$$

where R is the resistance value of the base resistor 47, C is the capacitance value of the oscillator capacitor 44, and the symbol $\propto$ means that the left-hand side is proportional to the right-hand side.

The oscillator capacitor 44 uses the same structure as that of the capacitor 61b included in the amplifier circuit 60 described above, and they are configured on the same semiconductor chip so that the capacitance ratio becomes constant. Similarly, the base resistor 47 uses the same structure as that of the feedback resistor 68 included in the amplifier circuit 60, and they are configured so that the resistance ratio between them is a predetermined ratio. This configuration, which will be described later in detail, increases the accuracy of the gain of the amplifier circuit 60.

Description of Physical Quantity Sensor Operation

FIG. 4-FIG. 7

Next, the following describes the operation of the physical quantity sensor of the present invention.

When the power supply voltage Vdd is applied to the physical quantity sensor, the driving circuit 80 starts driving the driving unit 11 of the sensor element 10 using the alternate current at a predetermined current value. Because the driving current of the driving circuit 80 is not affected by a change in the power supply voltage, the driving unit 11 is always in the stable oscillation state.

When a rotational angular rate is applied to the physical quantity sensor in this state, an AC signal with the amplitude, corresponding to the rotational angular rate, appears at the sensor element output S1. The detection circuit 20 detects this sensor element output S1 and converts the signal to a predetermined DC signal.

The oscillation circuit 40 provided in the clock generation circuit 30A oscillates at a predetermined frequency fo as described above. The oscillation output at the oscillation frequency of fo is output as the clock signal. It is also possible that the control circuit 50 divides the oscillation output S4 by a division ratio specified by the digital input S5 and outputs the divided signal as the clock signal S3. For simplicity, it is assumed in the description below that the oscillation output S4 is divided by two (0.5 times the frequency).

The amplifier circuit 60, which receives the clock signal S3, works as a low-pass filter that has a predetermined gain, and outputs the angular rate signal, generated by amplifying the detection output S2, from the sensor output S6. Because the driving condition of the sensor element 10 is always constant, the signal of the detection output S2 is not affected by the power supply voltage Vdd and the signal level becomes constant when a rotational angular rate is applied. However, the gain of the amplifier circuit 60 depends on the frequency of the clock signal S3 as described above.

As described above, the clock signal S3 is generated based on the oscillation output S4 of the oscillation circuit 40, and oscillation frequency of the oscillation circuit 40 is changed in proportion to the power supply voltage of the physical quantity sensor. Therefore, controlling the clock generation circuit 30A in such a way that the frequency of the clock signal S3 becomes proportional to the power supply voltage Vdd allows the sensor output S6, which is output from the amplifier circuit 60 based on the clock signal S3, to become proportional to the power supply voltage Vdd.

For example, when the power supply voltage of the physical quantity sensor is increased in the configuration described above, the detection sensitivity of the physical quantity sensor is increased in proportion to a change in the power supply voltage. As a result, the output signal voltage of the sensor output S6 output from the amplifier circuit 60 is increased. That is, the physical quantity sensor performs the level conversion operation so that its detection sensitivity becomes ratiometric to the power supply voltage.

For example, even if the same rotational angular rate is given to the physical quantity sensor, a 5% increase in the power supply voltage Vdd results in a 5% increase in the signal level of the sensor output S6. Conversely, when the power supply voltage Vdd of the physical quantity sensor is decreased, the output level of the sensor output S6 is decreased in proportion to the decrease in the power supply voltage Vdd.

Although the division ratio of the control circuit 50 is two in the above description, the division ratio of the control circuit 50 can be selected via the digital input S5. The switched capacitor circuit 61 of the amplifier circuit 60 can change the gain using an average switching frequency.

Therefore, selecting an appropriate value for the division ratio via the digital input S5 allows a detection sensitivity error in the physical quantity sensor, generated by a fabrication error in the sensor element 10, to be adjusted. The control circuit 50, a logic circuit for which the division ratio can be set very accurately, eliminates the need for a high-accuracy analog circuit for use in the fine adjustment of the detection sensitivity of the physical quantity sensor.

The gain of the amplifier circuit 60 of the physical quantity sensor according to the present invention is determined by the frequency of the oscillation output S4, the capacitance value of the capacitor 61b, and the resistance value of the feedback resistor 68. Because the amplifier circuit 60 is an inverting amplifier circuit in which the operation amplifier 69 is used, the DC gain K is represented as follows.

$K = $ −Feedback resistance value/Input resistance value $= -Rf/Re$ $\propto Rf/(1/(Cs \cdot fo))$ $\propto (Rf/R) \cdot (Cs/C)$ where Rf is the resistance value of the feedback resistor 68 and Re is the equivalent resistance value of the switched capacitor circuit 61. Cs is the capacitance of the capacitor 61b, fo is the frequency of the oscillation output S4, R is the resistance value of the base resistor 47, and C is the capacitance value of the oscillator capacitor 44.

That is, the above expression indicates that the gain of the amplifier circuit 60 depends on the capacitance ratio (Cs/C) between the capacitance Cs of the capacitor 61b and the capacitance C of the oscillator capacitor 44 and on the resistance ratio (Rf/R) between the resistance value Rf of the feedback resistor 68 and the resistance value R of the base resistor 47. It is known that a relative error in the same chip is extremely low (lower than 1%) even if there is a fabrication error between lots or chips in the semiconductor fabrication process.

The capacitors and resistor elements used in the present invention, though different in size, are configured on the same chip and have the same structure. Therefore, the relative error between the capacitance Cs of the capacitor 61b and the capacitance C of the oscillator capacitor 44 and the relative error between the resistance value Rf of the feedback resistor 68 and the resistance value R of the base resistor 47 are expected to be very small. In the expression of the gain shown above, the capacitance Cs and the capacitance C, and the resistance value Rf and the resistance value R, appear respectively in the numerator and the denominator with the result that the error is canceled each other. So, even if an absolute value error is present in the capacitors or the resistors included in the amplifier circuit 60 of the present invention, the gain value is highly accurate.

For example, in a chip for which the sheet resistance of a resistor element is set high because of a fabrication error, the resistance value of the base resistor 47, which is set high, decreases the frequency of the oscillation output S4. As a result, the equivalent resistance value of the switched capacitor circuit 61 is increased but the resistance value of the feedback resistor 68 is also set high proportionally. Therefore, the effects of those resistance values on the amplifier circuit 60 cancel each other, thus enabling the amplifier circuit 60 to have a constant gain value.

It is apparent that the gain of the amplifier circuit 60 is constant also when the sheet resistance of a resistor element is set low or when there is a fabrication error in the sheet capacitance of a capacitor. In addition, those characteristics are applicable even if the value of a resistor element or a capacitor is changed by a change in the ambient temperature of the physical quantity sensor.

In the present invention, the oscillator capacitor 44 provided in the oscillation circuit 40 and the capacitor 61$b$ of the switched capacitor circuit 61 provided in the amplifier circuit 60 are configured on the same chip and have the same structure, and the base resistor 47 provided in the oscillation circuit 40 and the feedback resistor 68 provided in the amplifier circuit 60 are configured on the same chip and have the same structure, as described above. This configuration ensures a highly accurate gain value even if an absolute error is present in the capacitors or the resistor elements.

In prior-art technology disclosed in Patent Document 1, it is possible that a polysilicon resistor configurable on a semiconductor chip or an external resistor element is used as another circuit element (resistor element 8) for determining the gain of the amplifier circuit 6.

The problems with those elements, which have no correlation with the above-described MOS device 7 in electrical characteristics, is that not only the absolute value error in the gain of the amplifier circuit is high but also the gain of the amplifier circuit 6 depends largely on a change in the ambient temperature. As described above, the present invention solves those problems with the prior art.

Although a voltage controlled oscillator is used in the oscillation circuit 40 described above, the present invention is not limited to this configuration. If the output level of the physical quantity sensor is not changed according to the power supply voltage Vdd, the oscillation circuit 40 may have a simpler configuration. For example, instead of the inverter 42 in the oscillation circuit 40 in the above embodiment, a general CR oscillation circuit may be used in which a resistor element may be connected between the input/output terminals of the inverter 41.

In this case, though the oscillation frequency of the oscillation circuit 40 is constant independently of the power supply voltage Vdd, the semiconductor fabrication errors or temperature characteristics, which may affect the gain of the amplifier circuit 60, can be canceled each other, and the gain of the amplifier circuit 60 can be stabilized, by configuring the added resistor element in such a way that it has the same structure as that of the base resistor 47.

Description of an Example of Another Configuration of Amplifier Circuit

Figure 8:
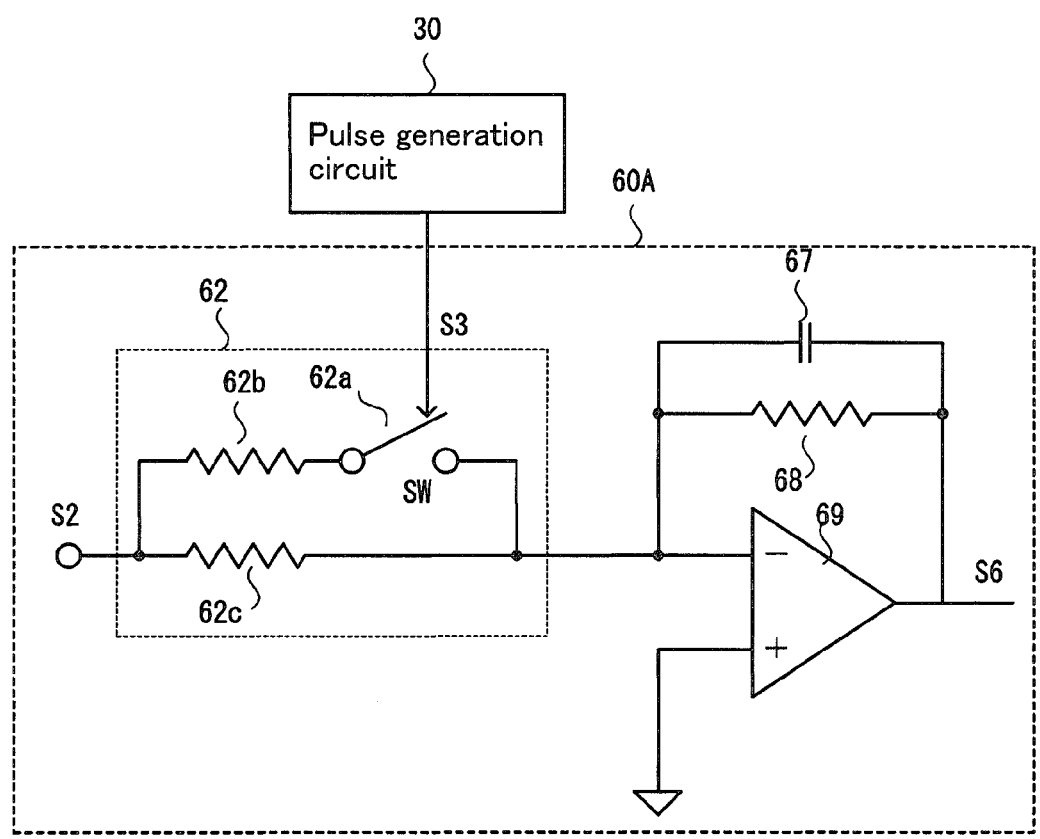
FIG. 8 is a circuit diagram showing another configuration of the amplifier circuit of the physical quantity sensor of the present invention.
Figure 9:
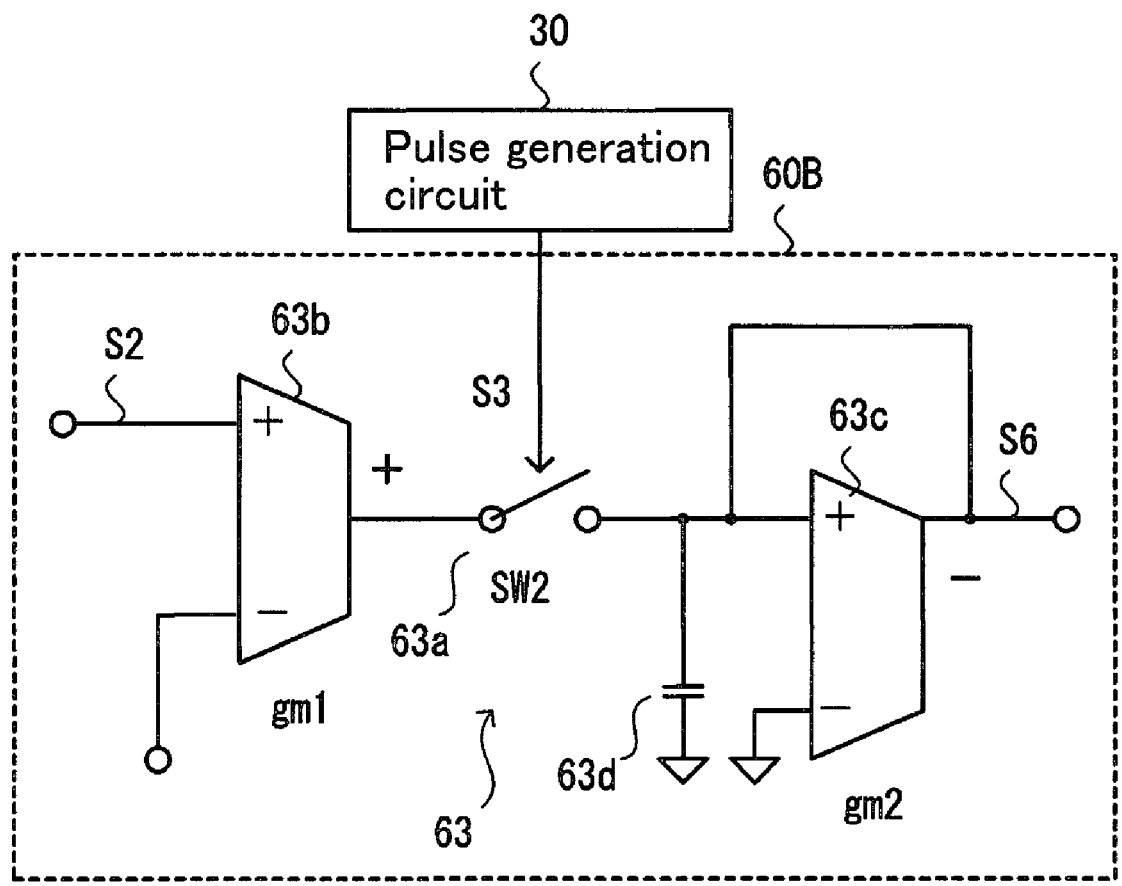
FIG. 9 is a circuit diagram showing a still another configuration of the amplifier circuit of the physical quantity sensor of the present invention.

FIGS. 8 and 9

The following describes an example of another configuration of the amplifier circuit with reference to FIG. 8 and FIG. 9.

The example of the configuration of an amplifier circuit shown in FIG. 8 is a configuration in which a switch open/close variable resistor is used, instead of the switched capacitor circuit, as the variable resistor of an inverting amplifier circuit that includes the operational amplifier described above. Referring to FIG. 8, a variable resistor 62 is connected as an input resistor that is connected to the inverting input terminal of an operation amplifier 69 of an inverting amplifier circuit 60A. A feedback resistor 68 and a capacitor 67 are connected in parallel between the output terminal and the inverting input terminal of the operation amplifier 69, and the sensor output S6 is output from the output terminal of the operation amplifier 69.

The variable resistor 62, configured by the parallel connection of a series-connected circuit, composed of a resistor 62$b$ and a switch 62$a$ which is configured a series circuit, and a resistor 62$c$, is connected to the inverting input terminal of the operation amplifier 69 as the input resistor. The switch 62$a$ is configured by the transmission gate and is opened/closed based on the pulse modulation signal received from a pulse generation circuit 30. The switch 62$a$ is opened/closed by the pulse modulation signal to form an equivalent resistor, with the equivalent resistance value defined by the average value of the duty cycles of the pulse modulation signal.

The resistance value of this variable resistor 62, which can be made variable, allows the gain of the amplifier circuit to be made variable in the same way as in the configuration example shown above. Changing the pulse modulation signal according to a change in the power supply voltage makes the sensor detection output ratiometric and gives high linearity.

An example of the configuration of the amplifier circuit shown in FIG. 9 is a gain adjustment circuit with the filer function using the voltage-current conversion circuit (OTA: Operational Transconductance Amplifier) where two voltage-current conversion circuits are connected with a switch between them. A gain adjustment circuit 63 of an amplifier circuit 60B is configured by connecting two voltage-current conversion circuits, 63$b$ and 63$c$, with a switch 63$a$ and a capacitor 63$d$ between them, and the switch 63$a$ is opened/closed by the pulse modulation signal received from a pulse generation circuit 30. Let d be the opened/closed ON/OFF duty cycle. The voltage-current conversion circuit 63$b$ receives the detection output S2 at the positive terminal and converts the detection output to the amount of current produced by multiplying the voltage difference from the negative terminal by the conversion coefficient gm1. The switch 63$a$ charges the capacitor 63$d$ with this current according to the pulse frequency of the pulse modulation signal or the duty cycle. The voltage-current conversion circuit 63$b$ converts the voltage, accumulated in the capacitor 63$d$, to the amount of current produced by multiplying the voltage by the coefficient −gm2 and outputs the current.

The transfer function of this amplifier circuit 60B is represented as $(gm1/gm2) \cdot (1/(1+s(C/gm2))) \cdot d$. Because d is determined by the on/off pulse duty cycle of the switch 63$a$, the gain of the amplifier circuit 60B can be made variable by changing the pulse modulation signal, received from the pulse generation circuit 30, according to the power supply voltage. The switch 63$a$ can be configured by a transmission gate.

Description of Switch Mechanism

FIG. 10, FIG. 11

Figure 10A:
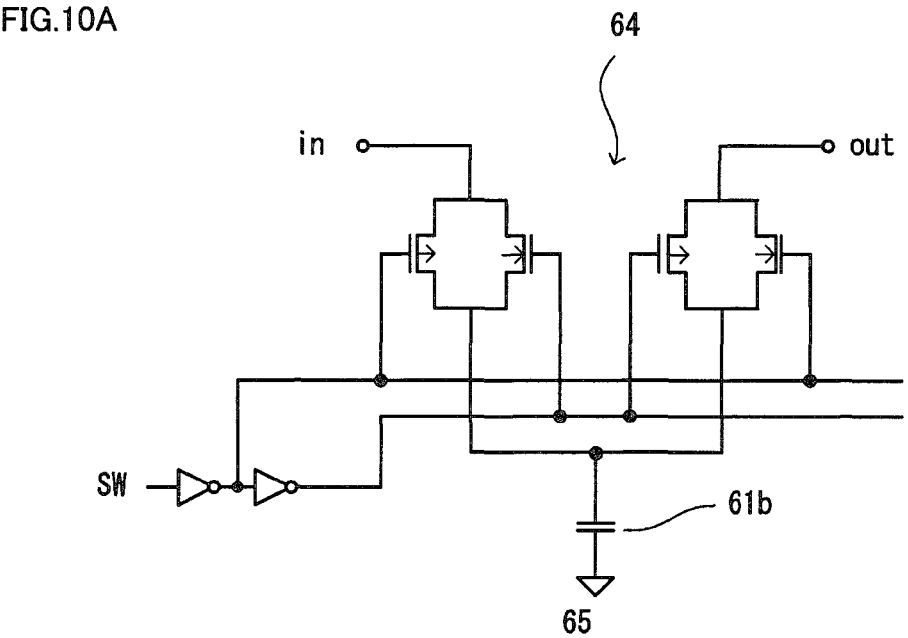
FIG. 10 is a diagram showing an example of the configuration of a two-switch mechanism.

In the examples of the configuration of the amplifier circuit given above, the gain varying circuit is configured by one switch and this switch is switched by the pulse modulation signal, received from the pulse generation circuit 30, to make the gain variable. This switch configuration can be configured by not only one switch but also two switches. FIG. 10A shows an example of the configuration of a one-switch mechanism indicated by the numeral 61$a$ in FIG. 6. In FIG. 10A, a switch 64 is configured by two transmission gates. The two transmission gates are alternately turned on and off by the switching signal SW to charge and discharge the capacitor 61*b*, and this signal switching is adjusted by the frequency to form an equivalent resistor.

Figure 10B:
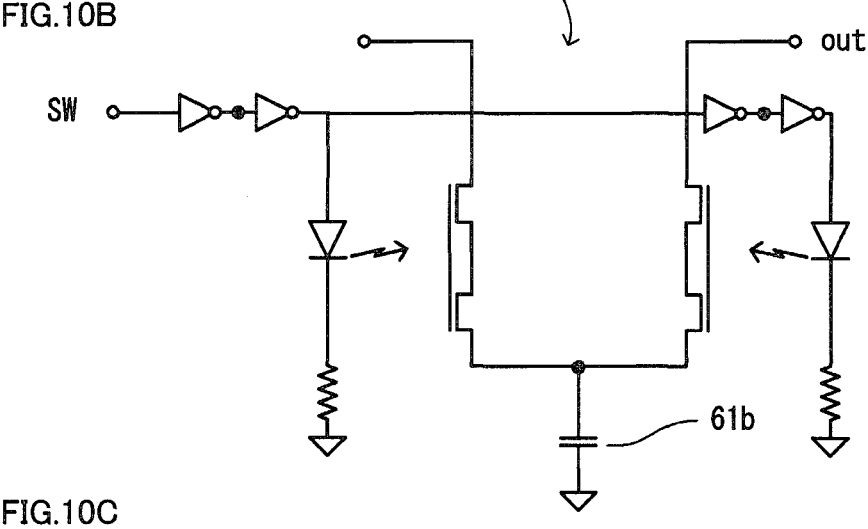

FIG. 10B shows an example of another configuration of a one-switch mechanism. In FIG. 10B, a switch 65 is configured by two photoMOS devices. The two photoMOS devices 65, which alternately turn on light-emitting diodes based on the switching signal SW and charge/discharge the capacitor 61*b*, adjusts the signal switching by means of the frequency to form an equivalent resistor.

Figure 10C:
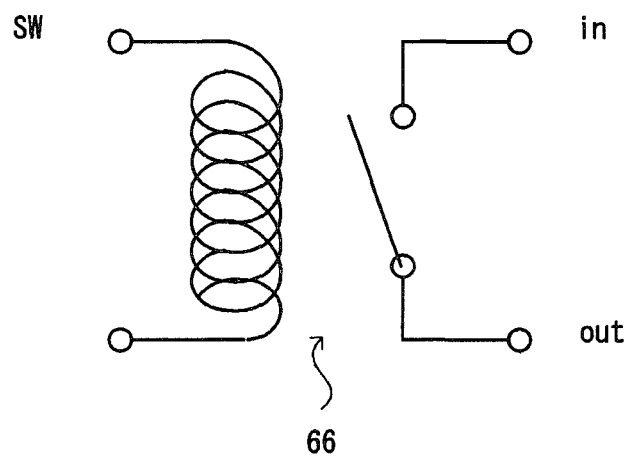

As the switch mechanism, not only the transmission gates and photoMOS devices described above but also an electromagnetic relay 66 such as the one shown in FIG. 10C may be used. The electromagnetic relay 66, which drives the electromagnetic coil based on the switch signal SW, turns on/off the switch.

Figure 11A:
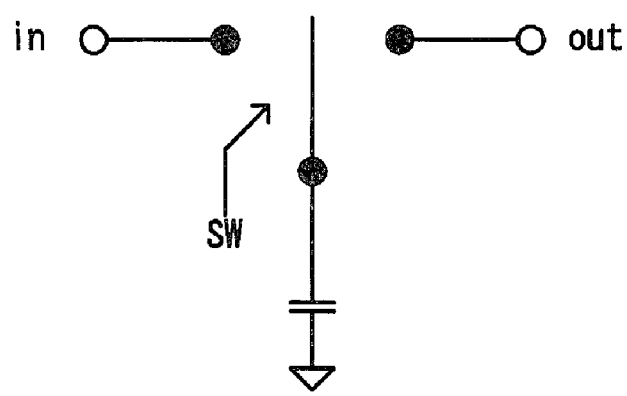
FIG. 11 is a diagram showing the general configuration of a gain varying circuit.

FIG. 11 shows another example of the gain varying circuit. FIG. 11A shows the configuration of a one-switch mechanism, which corresponds to the configuration of the switched capacitor circuit 61 shown in FIG. 6 and to those shown in FIGS. 10A and 10B. In this configuration, a one-switch mechanism is used between the input terminal (in) and the output terminal (out) via a capacitor, and this switching is adjusted by the frequency to form an equivalent resistor.

Figure 11B:
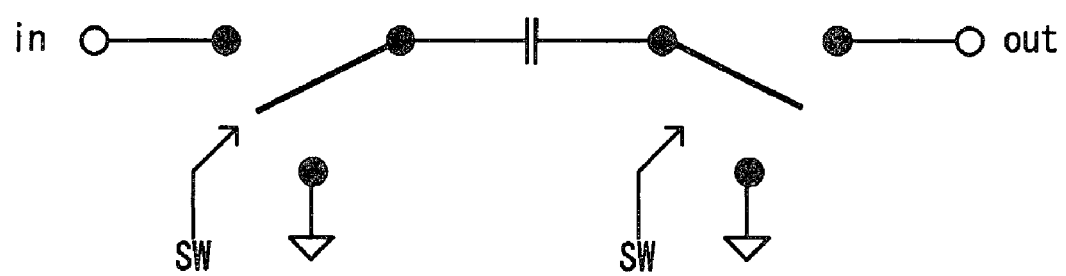

On the other hand, FIG. 11B shows the configuration of a two-switch mechanism. In this configuration, a two-switch mechanism, which has a capacitor between the input terminal (in) and the output terminal (out), is provided and the switching of those two switches is adjusted by the frequency to form an equivalent resistor. The configuration in FIG. 11B can be implemented by providing two switch mechanisms shown in FIG. 10A or FIG. 10B.

Description of an Example of Configuration of Pulse Modulation Circuit

FIG. 12, FIG. 13

Figure 12:
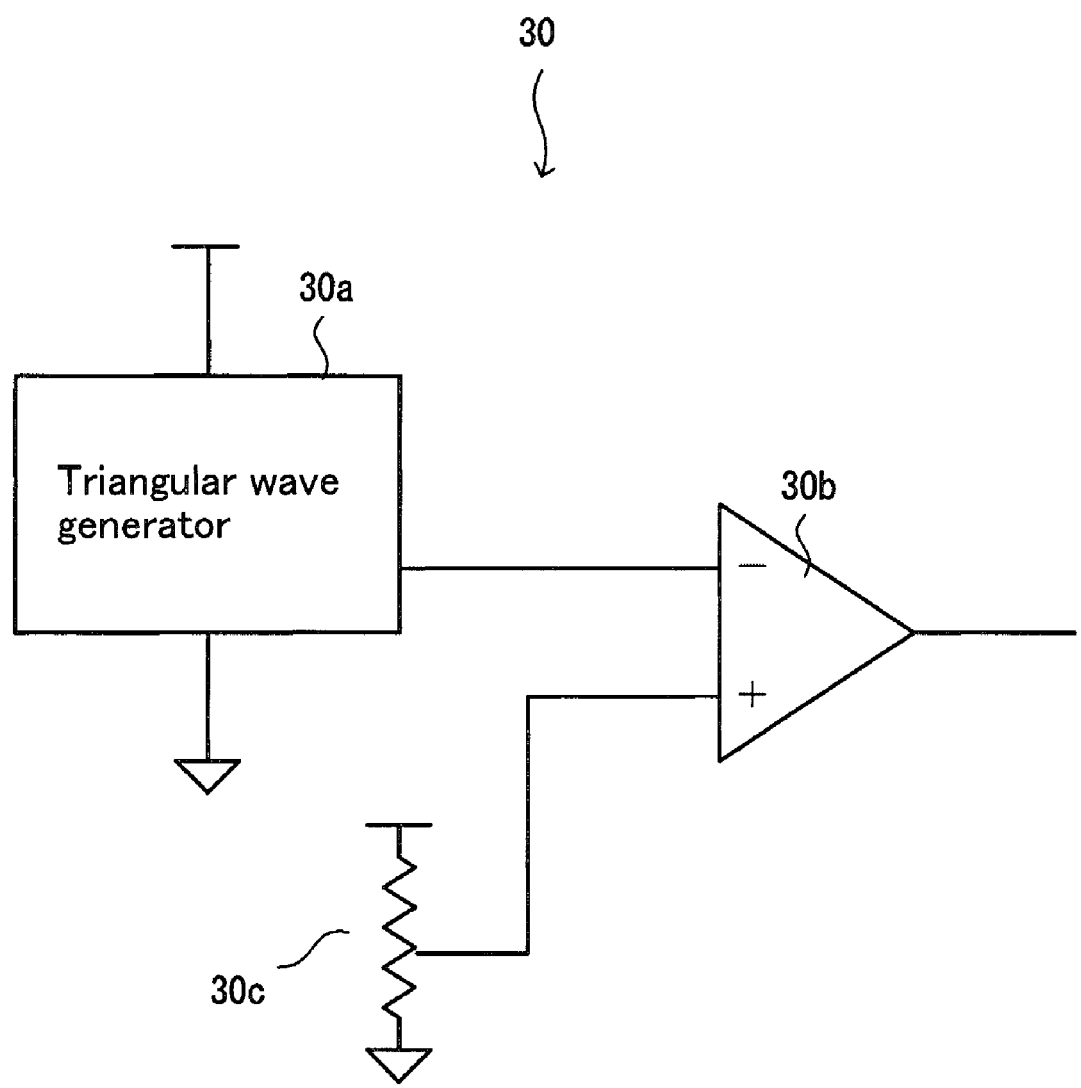
FIG. 12 is a configuration diagram showing an example of the configuration of a pulse modulation circuit.
Figure 13:
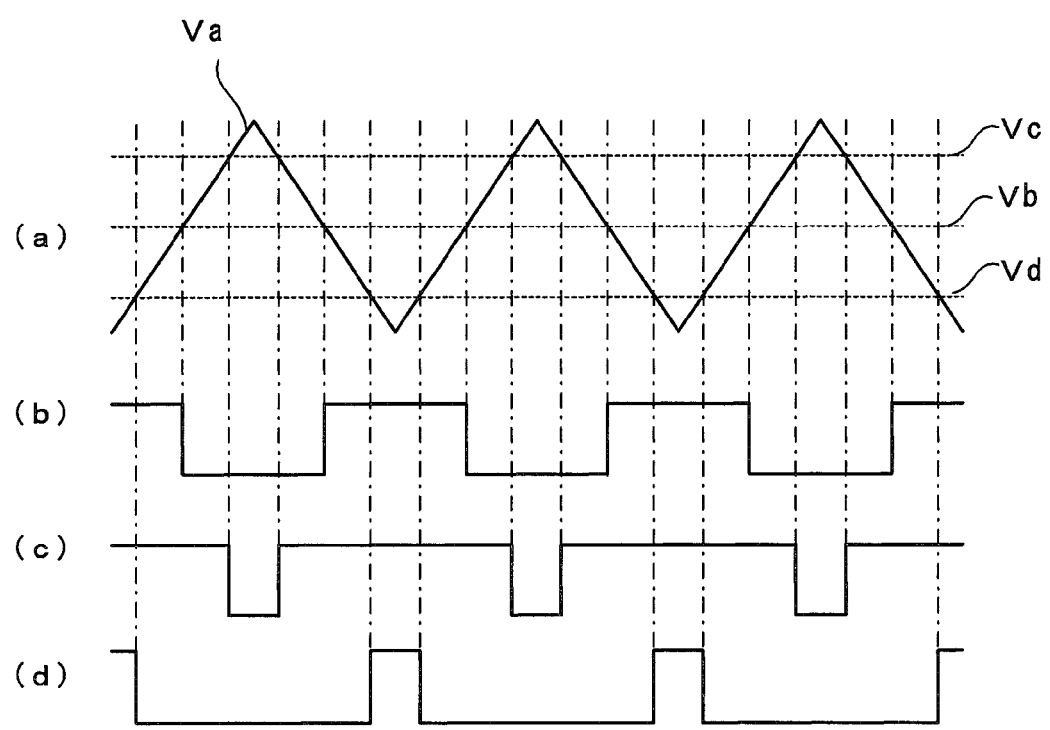
FIG. 13 is a signal diagram showing an example of the configuration of the pulse modulation circuit.
Figure 14:
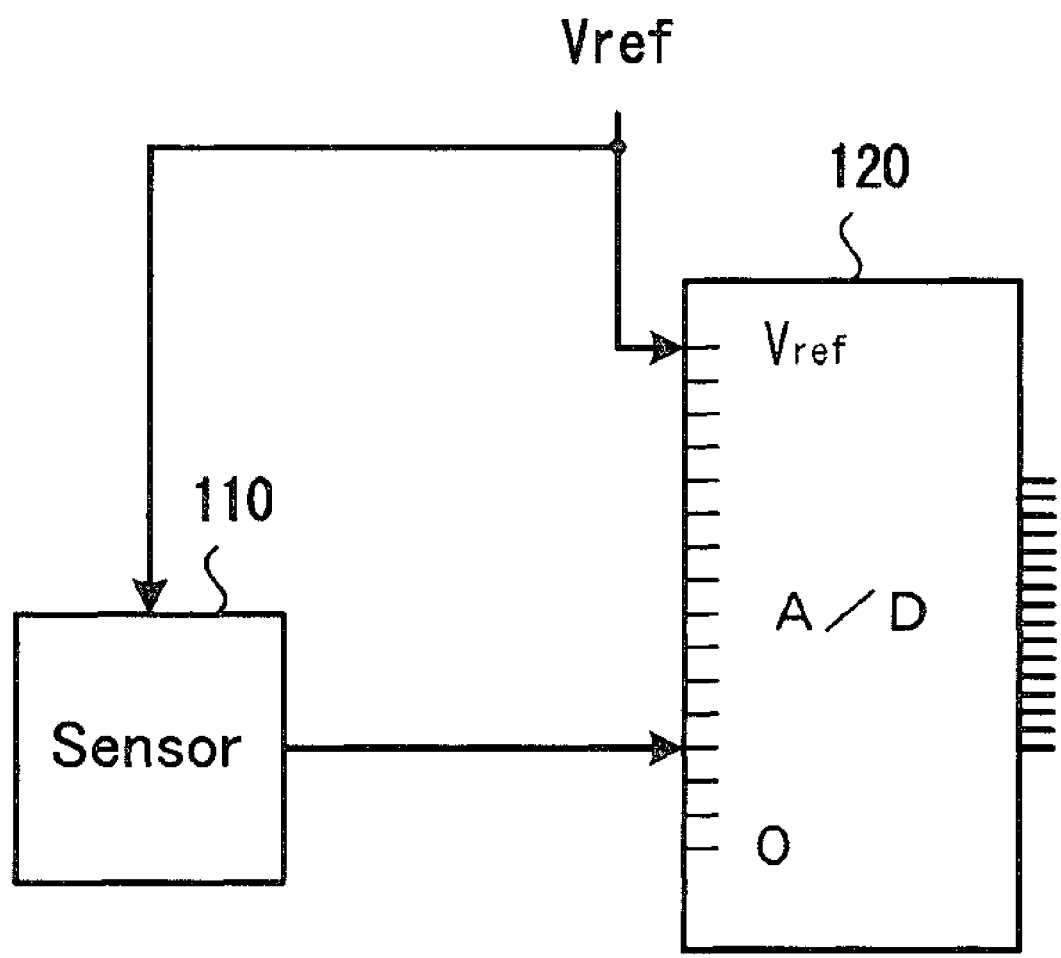
FIG. 14 is a diagram showing a general ratiometric configuration.
Figure 15A:
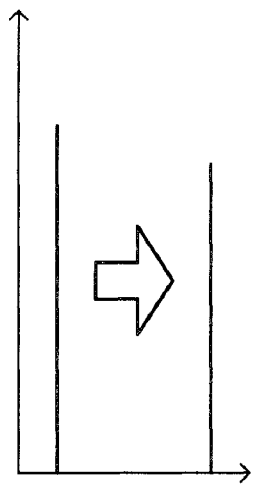
FIG. 15 is a diagram showing a general ratiometric configuration.
Figure 15B:
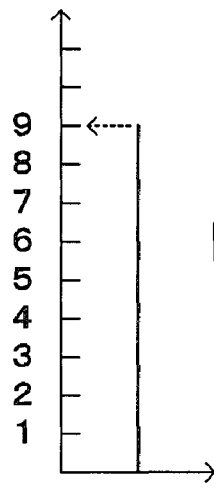
Figure 15C:
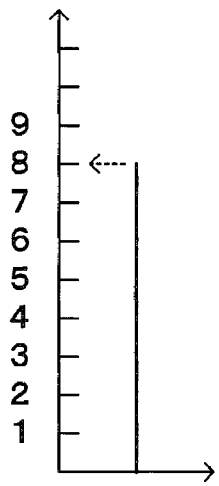
Figure 15D:
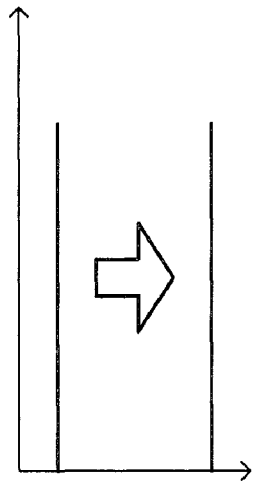
Figure 15E:
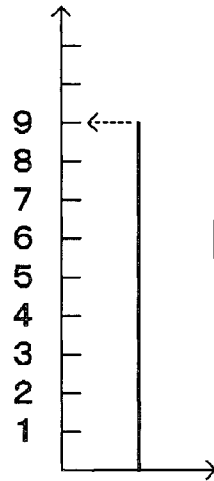
Figure 15F:
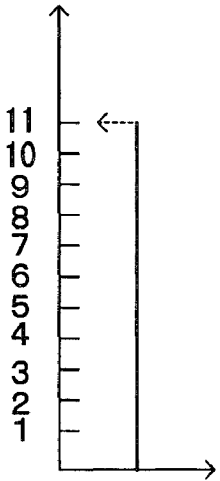
Figure 15G:
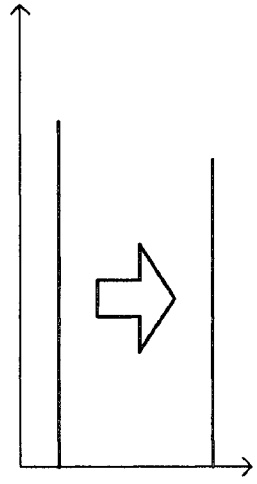
Figure 15H:
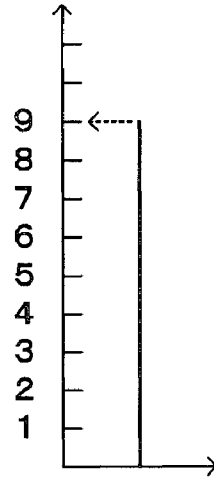
Figure 15I:
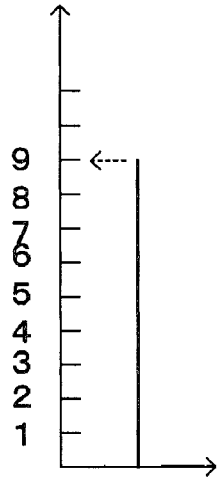
Figure 16:
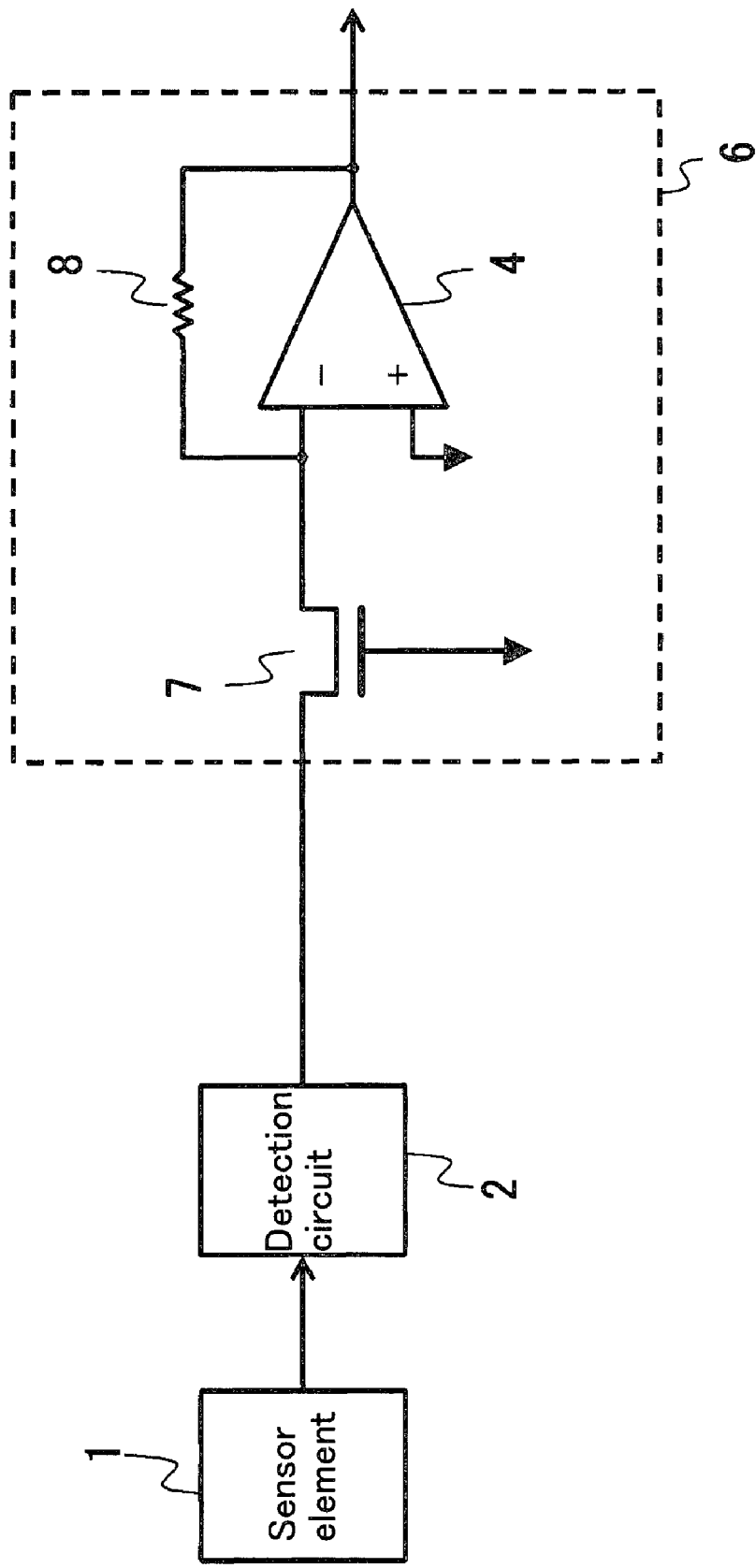
FIG. 16 is a diagram showing a conventional physical quantity sensor.

The following describes an example of the configuration of a pulse modulation circuit, included in the pulse generation circuit 30 for making the pulse width (duty cycle) variable, with reference to FIG. 12 and FIG. 13. Referring to FIG. 12, the pulse generation circuit 30 comprises a triangular wave generator 30*a*, a comparator 30*b*, and a resistor 30*c*. The resistance value and the division ratio may be set arbitrarily for the resistor 30*c* that divides the power supply voltage. The comparator 30*b* compares the triangular wave signal, which is generated by the triangular wave generator 30*a* and has a constant amplitude value, with the voltage value set by the resistor 30*c* and generates a pulse signal. Therefore, the comparator 30*b* compares the angular wave signal, which has a constant amplitude value that does not depend on the power supply voltage, with the threshold voltage that depends on the power supply voltage.

FIG. 13A shows an example of pulse signal generation and, in the figure, the triangular wave signal Va generated by the triangular wave generator 30*a* and threshold voltages Vb, Vc, and Vd formed by the resistor 30*c* are shown. The comparator 30*b* compares the triangular wave signal Va with the threshold voltages Vb, Vc, and Vd and generates a pulse signal based on the relation. FIG. 13B shows the a pulse signal generated by comparing the triangular wave signal Va with the threshold voltage Vb and, when the threshold voltage Vb is the half of the amplitude of the triangular wave signal Va, the pulse signal with the duty cycle of 0.5 is generated. FIG. 13C shows a pulse signal generated by comparing the triangular wave signal Va with the threshold voltage Vc and, when the threshold voltage Vc is higher than the half of the amplitude of the triangular wave signal Va, the duty cycle of the generated signal is smaller than 0.5. FIG. 13D shows a pulse signal generated by comparing the triangular wave signal Va with the threshold voltage Vd and, when the threshold voltage Vd is lower than the half of the amplitude of the triangular wave signal Va, the duty cycle of the generated signal is larger than 0.5.

Therefore, the pulse modulation signal based on the power supply voltage can be formed by considering both the threshold voltage, formed by the resistor 30*c*, based on the power supply voltage.

The physical quantity sensor in the embodiment of the present invention has been described. The present invention allows the physical quantity sensor to have both the linearity characteristics and the ratiometric characteristics, which are necessary for providing a high-accuracy sensor detection output but are conventionally difficult for the physical quantity sensor to have. In addition, the present invention provides a physical quantity sensor which is less affected by a fabrication error or a temperature change and whose detection sensitivity can be adjusted accurately.

The present invention is applicable to the output signal level adjustment of various types of physical quantity sensors such as an angular rate sensor typified by a vibratory gyroscope, a magnetic sensor, and an acceleration sensor.

The invention claimed is:

1. A physical quantity sensor comprising:
    a sensor circuit that converts an externally applied physical quantity to an electrical signal and outputs a detection signal; and
    an adjustment circuit that adjusts the detection signal, which is received from said sensor circuit, to a predetermined signal wherein
    said adjustment circuit comprises:
    a pulse generation circuit that generates a pulse modulation signal based on a power supply voltage that drives said adjustment circuit; and
    an amplifier circuit that amplifies the detection signal, which is received from said sensor circuit, by varying a gain of the amplifier circuit based on the pulse modulation signal generated by the pulse generation circuit whereby
    a detection sensitivity of an output signal, which is output from said amplifier circuit, is made variable according to the power supply voltage.

2. The physical quantity sensor according to claim 1, wherein said pulse generation circuit generates the pulse modulation signal by modulating a pulse width or a pulse frequency, which is defined by a predetermined function, based on the power supply voltage.

3. The physical quantity sensor according to claim 2 wherein the predetermined function is a linear function and said pulse generation circuit generates the pulse modulation signal with a pulse width or a pulse frequency proportional to the power supply voltage.

4. The physical quantity sensor according to any one of claims 1-3 wherein
    said amplifier circuit is an inverting amplifier whose gain is determined by a resistance value ratio between an input resistor circuit and a feedback resistor circuit,
    at least one of said input resistor circuit and said feedback resistor circuit is a variable resistor circuit whose resistance value is made variable by the pulse modulation signal, and said amplifier circuit makes the gain variable by making variable the resistance value of said variable resistor circuit by the pulse modulation signal.

5. The physical quantity sensor according to claim 4 wherein said variable resistor circuit is configured by a switched capacitor circuit and a selection of a switch, provided for a capacitor, is performed by the pulse modulation signal to make variable an equivalent resistor.

6. The physical quantity sensor according to claim 4 wherein said variable resistor circuit is configured by a resistor and a switch and an equivalent resistor is made variable by intermittently turning on and off said switch by the pulse modulation signal.

7. The physical quantity sensor according to claim 4 wherein said variable resistor circuit is configured by connecting two switches with a capacitor therebetween and an equivalent resistor is made variable by charging/discharging the capacitor by selecting the two switches.

8. The physical quantity sensor according to claim 4 wherein said variable resistor circuit is configured by connecting two phototransistors with a capacitor therebetween and an equivalent resistor is made variable by charging/discharging the capacitor by selecting the two phototransistors.

9. The physical quantity sensor according to claim 2 or 3 wherein
said amplifier circuit is a gain adjustment circuit configured by connecting two voltage-current conversion circuits with a switch therebetween and
said gain adjustment circuit makes the gain variable by making variable a transfer function of the gain adjustment circuit by opening and closing the switch by the pulse modulation signal.

10. The physical quantity sensor according to any one of claims 1-3 wherein said pulse generation circuit is a circuit that compares a triangular wave, which has a fixed amplitude, with a predetermined threshold and, during a period when the triangular wave is higher or lower than the threshold, generates a pulse, said threshold being the power supply voltage.

11. A physical quantity sensor comprising:
a sensor element that converts an externally applied physical quantity to an electrical signal; a detection circuit that amplifies and detects an output signal of said sensor element; and an adjustment circuit that adjusts an output signal, received from said detection circuit, to a predetermined signal by applying a power supply voltage wherein
said adjustment circuit comprises an amplifier circuit that comprises a switched capacitor circuit that moves electrical charges by switching a connection state of a capacitor; and a clock generation circuit that generates a clock signal,
whereby said physical quantity sensor controls said clock generation circuit based on the power supply voltage and, based on the clock signal generated by said clock generation circuit, makes variable a detection sensitivity of an output signal, which is output from said amplifier circuit, according to the power supply voltage.

12. The physical quantity sensor according to claim 11 wherein the detection sensitivity of the output signal is proportional to the power supply voltage.

13. The physical quantity sensor according to claim 11 wherein said clock generation circuit comprises an oscillation circuit that outputs an oscillation signal.

14. The physical quantity sensor according to claim 13 wherein said clock generation circuit further comprises a control circuit that divides an output signal of said oscillation circuit by a predetermined frequency dividing ratio and outputs a frequency divided signal.

15. The physical quantity sensor according to claim 12 wherein said clock generation circuit comprises an oscillation circuit and said oscillation circuit is configured by a voltage controlled oscillator that varies a frequency of an output signal thereof according to a voltage input of the power supply voltage.

16. The physical quantity sensor according to claim 11 wherein said clock generation circuit comprises an oscillation circuit, which has a capacitor, and said capacitor of said oscillation circuit has the same structure as the capacitor provided in said amplifier circuit.

17. The physical quantity sensor according to claim 11 wherein said clock generation circuit comprises an oscillation circuit, which has a resistor element, and said resistor element of said oscillation circuit has the same structure as a resistor element provided in said amplifier circuit.

18. A physical quantity sensor comprising:
a sensor element that converts an externally applied physical quantity to an electrical signal; a driving circuit that drives said sensor element; a detection circuit that amplifies and detects an output signal of said sensor element; and an adjustment circuit that adjusts an output signal, received from said detection circuit, to a predetermined signal by applying a power supply voltage wherein
said driving circuit comprises a constant voltage circuit that outputs a constant voltage used as a base of driving conditions of said sensor element and
said adjustment circuit comprises an amplifier circuit that comprises a switched capacitor circuit that moves electrical charges by switching a connection state of a capacitor; and a clock generation circuit that generates a clock signal,
whereby said physical quantity sensor controls said clock generation circuit based on the power supply voltage and, based on the clock signal generated by said clock generation circuit, makes variable a detection sensitivity of an output signal, which is output from said amplifier circuit, according to the power supply voltage.

* * * * *